(12) United States Patent
Song et al.

(10) Patent No.: US 11,204,515 B2
(45) Date of Patent: Dec. 21, 2021

(54) DISPLAY DEVICE

(71) Applicant: Samsung Display Co., Ltd., Yongin-Si (KR)

(72) Inventors: Hyung Jin Song, Hwaseong-si (KR); Dong Hee Shin, Asan-si (KR); Yoo Mi Ra, Ansan-si (KR); Soo Hong Cheon, Seoul (KR)

(73) Assignee: Samsung Display Co., Ltd.

( * ) Notice: Subject to any disclaimer, the term of this patent is extended or adjusted under 35 U.S.C. 154(b) by 31 days.

(21) Appl. No.: 16/196,927

(22) Filed: Nov. 20, 2018

(65) Prior Publication Data
US 2019/0258102 A1    Aug. 22, 2019

(30) Foreign Application Priority Data

Feb. 20, 2018    (KR) .................. 10-2018-0019716

(51) Int. Cl.
*G02F 1/133* (2006.01)
*G02F 1/1335* (2006.01)
*G02F 1/1343* (2006.01)

(52) U.S. Cl.
CPC ........ *G02F 1/13306* (2013.01); *G02F 1/1343* (2013.01); *G02F 1/133512* (2013.01)

(58) Field of Classification Search
None
See application file for complete search history.

(56) References Cited

U.S. PATENT DOCUMENTS 5,917,572 A * 6/1999 Kurauchi ............ G02F 1/13394
349/156

| | | | |
|---|---|---|---|
| 2004/0201815 A1* | 10/2004 | Yamamoto | G02F 1/133371 349/156 |
| 2005/0052590 A1* | 3/2005 | Ochiai | G02B 6/0068 349/71 |
| 2016/0380004 A1* | 12/2016 | Lee | H01L 27/1225 349/46 |
| 2017/0115518 A1* | 4/2017 | Shin | H01L 27/1248 |
| 2018/0180920 A1* | 6/2018 | Zhang | G02F 1/136227 |

FOREIGN PATENT DOCUMENTS

KR    10-2005-0089418 A    9/2005
KR    10-2017-0047466 A    5/2017

* cited by examiner

*Primary Examiner* — Edward J Glick
*Assistant Examiner* — David Y Chung
(74) *Attorney, Agent, or Firm* — Innovation Counsel LLP

(57) ABSTRACT

A display device includes a base substrate that comprises a display area and a peripheral area; a first circuit part that is located in the peripheral area of the base substrate; a first pixel that is located in the display area of the base substrate; and a second pixel that is located in the display area of the base substrate, wherein the first pixel is located between the first circuit part and the second pixel along a direction and comprises a first organic pattern that comprises a first portion located on the base substrate and a second portion protruding upward from the first portion, and the second pixel comprises a second organic pattern that comprises a third portion located on the base substrate and a fourth portion protruding upward from the third portion, wherein the first portion, the second portion, the third portion and the fourth portion are made of the same material, and a width of the second portion measured along the direction is different from a width of the fourth portion measured along the direction.

19 Claims, 26 Drawing Sheets

DISPLAY DEVICE

This application claims the benefit of Korean Patent Application No. 10-2018-0019716, filed on Feb. 20, 2018, in the Korean Intellectual Property Office, the disclosure of which is incorporated herein by reference in its entirety.

BACKGROUND

1. Field

The present disclosure relates to a display device.

2. Description of the Related Art

Liquid crystal displays (LCDs) are one of the most widely used types of flat panel displays. An LCD includes a pair of substrates having field generating electrodes such as pixel electrodes and a common electrode, and a liquid crystal layer interposed between the two substrates. In the LCD, voltages are applied to the field generating electrodes to generate an electric field in the liquid crystal layer. Liquid crystal molecules of the liquid crystal layer are aligned based on the voltages applied to the field generating electrodes, and the polarization of incident light is controlled. As a result, a desired image is displayed on the LCD.

With growing popularity of LCDs as flat panel displays, various research and development efforts are being made to improve display quality and reliability of the LCDs.

SUMMARY

Embodiments of the present disclosure provide a display device with improved display quality and reliability.

However, embodiments of the present disclosure are not restricted to the one set forth herein. The above and other aspects of the present disclosure will become more apparent to one of ordinary skill in the art to which the present disclosure pertains by referencing the detailed description of the present disclosure given below.

According to an embodiment, there is provided a display device. The display device includes a base substrate that includes a display area and a peripheral area; a first circuit part that is located in the peripheral area of the base substrate; a first pixel that is located in the display area of the base substrate; and a second pixel that is located in the display area of the base substrate, wherein the first pixel is located between the first circuit part and the second pixel along a direction and includes a first organic pattern that includes a first portion located on the base substrate and a second portion protruding upward from the first portion, and the second pixel includes a second organic pattern that includes a third portion located on the base substrate and a fourth portion protruding upward from the third portion, wherein the first portion, the second portion, the third portion and the fourth portion are made of the same material, and a width of the second portion measured along the direction is different from a width of the fourth portion measured along the direction.

According to another embodiment, there is provided a display device. The display device includes a base substrate that includes a display area and a peripheral area; a circuit part that is located in the peripheral area of the base substrate; a first pixel that is located in the display area of the base substrate; and a second pixel that is located in the display area of the base substrate, wherein the first pixel is located between the circuit part and the second pixel along a direction and includes a first organic pattern that includes a first portion located on the base substrate and having a first hardness and a second portion having a second hardness relatively greater than the first hardness, and the second pixel includes a second organic pattern that includes a third portion located on the base substrate and having a third hardness and a fourth portion having a fourth hardness relatively greater than the third hardness, wherein a width of the first organic pattern measured along the direction is different from a width of the second organic pattern measured along the direction.

The present disclosure is not limited to the aforementioned embodiments, and other embodiments that are not mentioned above will be apparent to a person having ordinary skill in the art from the following description.

Details of other exemplary embodiments will be included in the detailed description of the present disclosure and the accompanying drawings.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
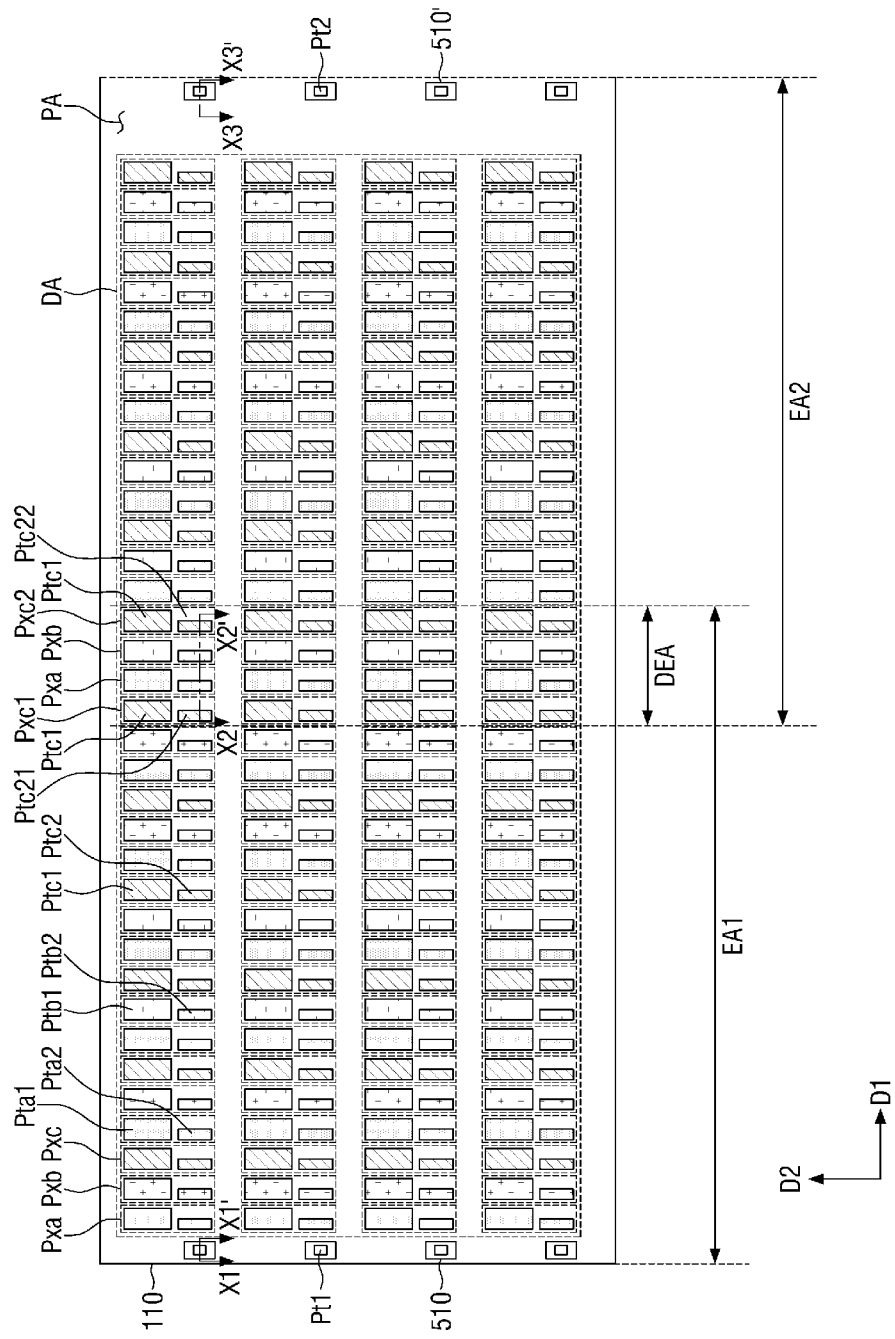
FIG. 1 is a conceptual plan view of an array substrate of a display device according to an embodiment.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art. Like reference numerals refer to like elements throughout the specification.

The terminology used herein is for the purpose of describing particular embodiments only and is not intended to be limiting of the inventive concept. As used herein, singular forms "a", "an," and "the" are intended to include plural forms as well, unless the context clearly indicates otherwise. It will be further understood that the terms "comprises" and/or "comprising," when used in this specification, specify a presence of stated features, integers, steps, operations, elements, and/or components, but do not preclude a presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or one or more intervening elements or layers may be present. In contrast, when an element is referred to as being "directly on". "directly connected to" or "directly coupled to" another element or layer, there may be no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the inventive concept.

Throughout the specification, the same reference numerals are used for the same or similar elements.

Hereinafter, embodiments of the present disclosure will be described with reference to the drawings.

Figure 2:
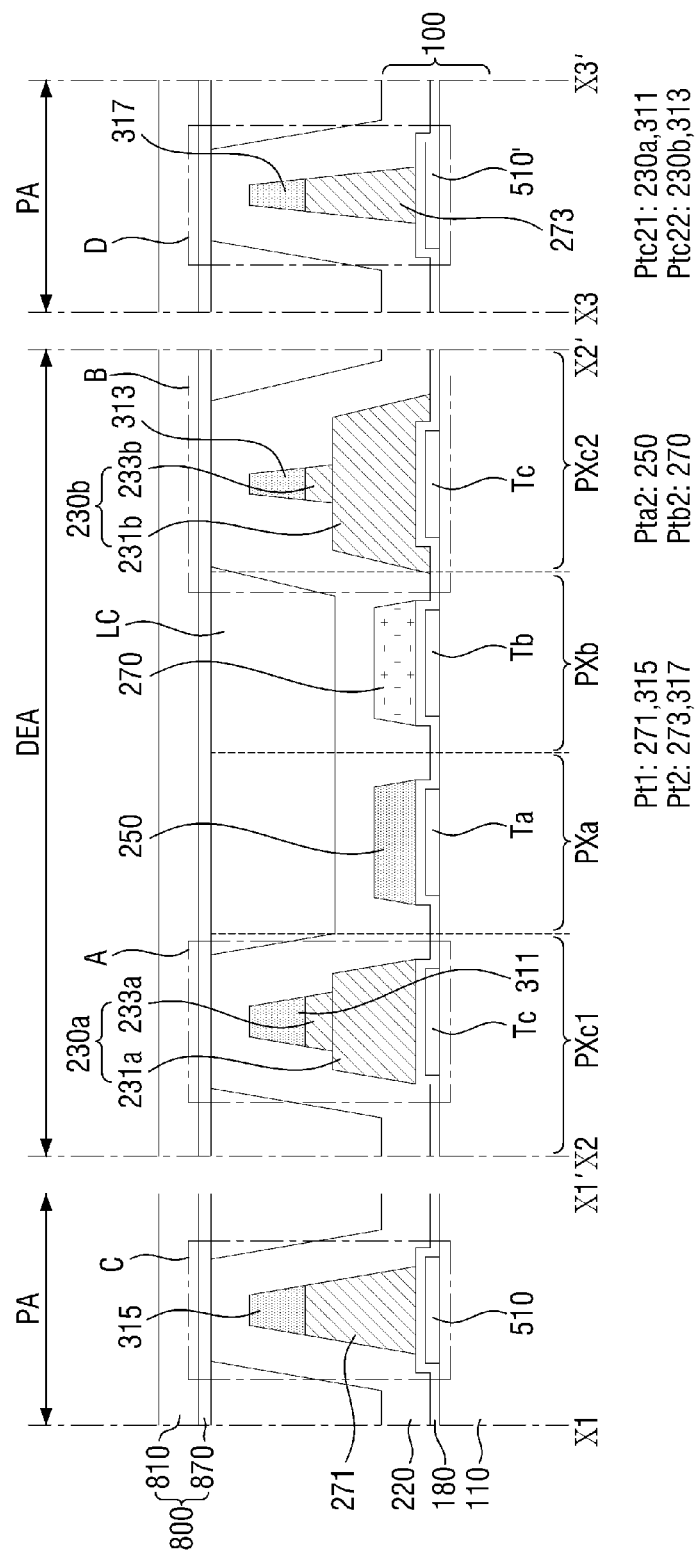
FIG. 2 is a cross-sectional view of the display device including the array substrate of FIG. 1, taken along the lines X1-X1'. X2-X2' and X3-X3'.
Figure 3:
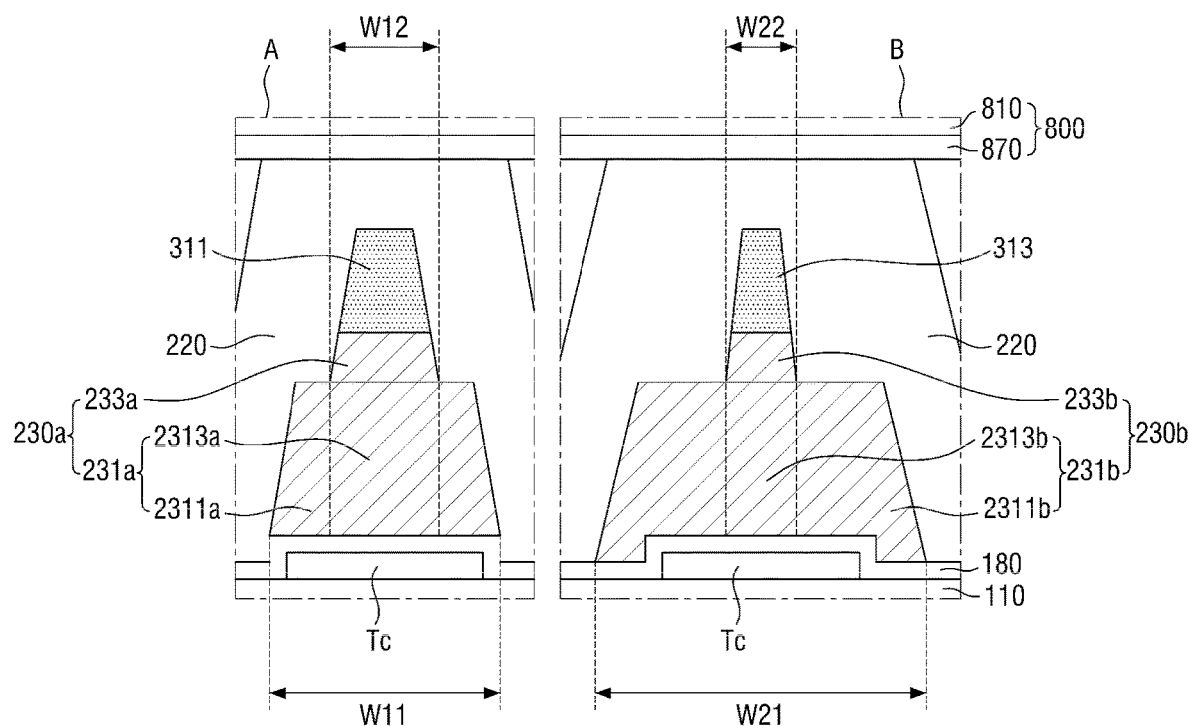
FIG. 3 is an enlarged view of a portion 'A' and a portion 'B' of FIG. 2.
Figure 4:
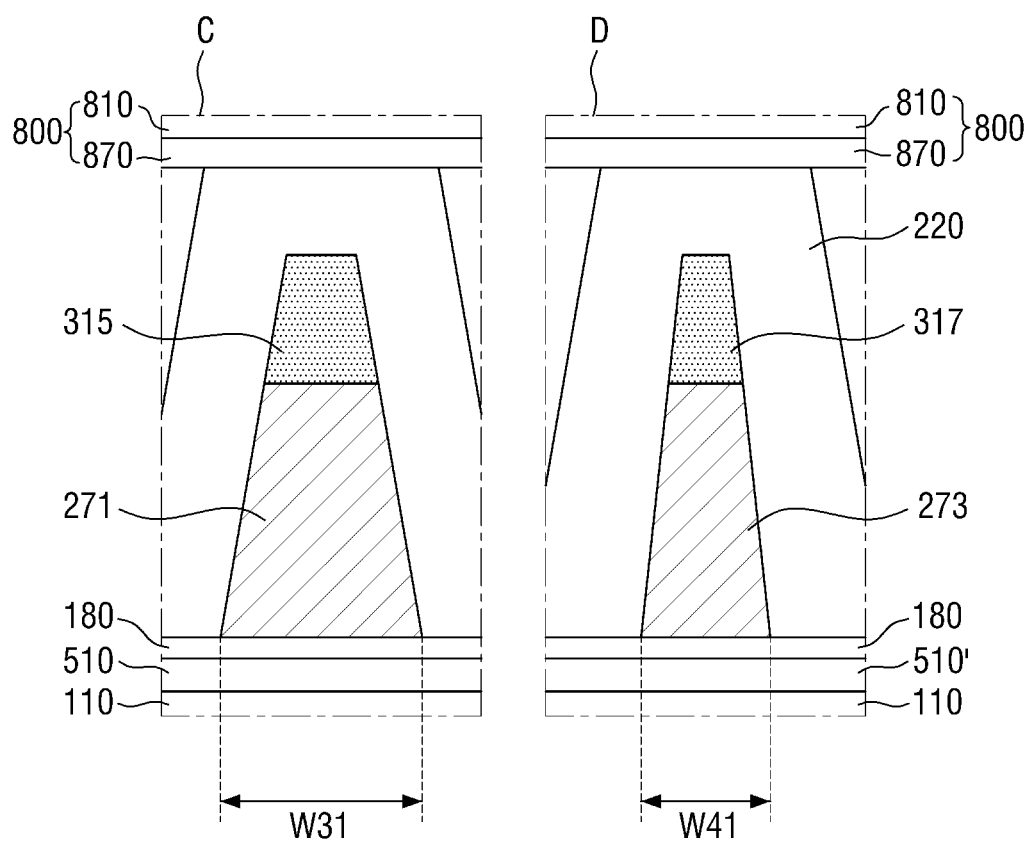
FIG. 4 is an enlarged view of a portion 'C' and a portion 'D' of FIG. 2.

FIG. 1 is a conceptual plan view of an array substrate 100 of a display device 1 according to an embodiment. FIG. 2 is a cross-sectional view of the display device 1 including the array substrate 100 of FIG. 1, taken along the lines X1-X1', X2-X2' and X3-X3'. FIG. 3 is an enlarged view of a portion 'A' and a portion 'B' of FIG. 2. FIG. 4 is an enlarged view of a portion 'C' and a portion 'D' of FIG. 2.

Referring to FIGS. 1 through 4, the display device 1 according to the embodiment may include the array substrate 100, a counter substrate 800 facing the array substrate 100, and a liquid crystal layer LC interposed between the array substrate 100 and the counter substrate 800.

The planar structure of the array substrate 100 will now be described with reference to FIG. 1.

Referring to FIG. 1, the array substrate 100 may include a first base substrate 110, a plurality of first pixels Pxa, a plurality of second pixels Pxb, a plurality of third pixels Pxc, a plurality of first circuit parts 510 and a plurality of second circuit parts 510', The array substrate 100 may further include a plurality of first peripheral patterns Pt1 and a plurality of second peripheral patterns Pt2.

The first base substrate 110 may be a transparent insulating substrate. For example, the first base substrate 110 may be a glass substrate, a quartz substrate, or a transparent resin substrate. In addition, the first base substrate 110 may include polymer or plastic having high thermal resistance. In some embodiments, the first base substrate 110 may have flexibility. That is, the first base substrate 110 may be a deformable substrate that can be rolled, folded, or bent.

The first base substrate 110 may include a display area DA and a peripheral area PA around the display area DA.

The display area DA may be an area that displays an image, and the peripheral area PA may be an area that does not display an image. In some embodiments, circuitry, such as wires, elements, etc., required to display an image may be located in the peripheral area PA.

In FIGS. 1 through 4, the peripheral area PA is illustrated as being located outside the display area DA. However, the peripheral area PA is not necessarily located outside the display area DA. In addition, although the peripheral area PA is illustrated as surrounding the display area DA in a plan view, it does not necessarily surround the display area DA. In some embodiments, the peripheral area PA may surround only a portion of the display area DA.

From a perspective of a mask exposure in a manufacturing process, the first base substrate 110 may include a first exposure area EA1, a second exposure area EA2, and an area in which the first exposure area EA1 and the second exposure area EA2 overlap, for example, a double exposure area DEA in which exposure is performed twice. A portion of the double exposure area DEA may be included in the display area DA, and a portion of the display area DA excluding the double exposure area DEA may be a single exposure area.

The first pixels Pxa, the second pixels Pxb, and the third pixels Pxc are located in the display area DA of the first base substrate 110. The first pixels Pxa, the second pixels Pxb, and the third pixels Pxc may be pixels displaying different colors. In an embodiment, the first pixels Pxa may display a first color, the second pixels Pxb may display a second color that is different from the first color, and the third pixels Pxc may display a third color that is different from the first color and the second color.

The first pixels Pxa, the second pixels Pxb, and the third pixels Pxc may be arranged in various forms. In FIG. 1, the first through third pixels Pxa through Pxc are sequentially arranged along a first direction D1, for example, along a horizontal direction based on the orientation of the drawing, and the same pixels are arranged along a second direction D2 that intersects the first direction D1, for example, along a vertical direction based on the orientation of the drawing. This structure will hereinafter be described for ease of description, but some embodiments of the present inventive concept are not limited to this structure. In an embodiment, not all pixels arranged along the vertical direction based on FIG. 1 may be the same. That is, not all pixels included in one pixel column may be the same. For example, a first pixel column may include the second pixels Pxb and/or the third pixels Pxc, as well as the first pixels Pxa.

Each of the first pixels Pxa may include a first thin film transistor Ta located on the first base substrate 110, a protective layer 180 located on the first thin film transistor Ta, a first insulating pattern Pta1 and a second insulating pattern Pta2 that are located on the protective layer 180, and a first pixel electrode (not illustrated) that is located on the first insulating pattern Pta1 and electrically connected to the first thin film transistor Ta. In some embodiments, the first insulating pattern Pta1 and the second insulating pattern Pta2 may be spaced from each other. In an embodiment, the first insulating pattern Pta1 and the second insulating pattern Pta2 may be connected to each other.

The second insulating pattern Pta2 of each of the first pixels Pxa may include a first organic pattern 250, and the first organic pattern 250 may overlap the first thin film transistor Ta. In some embodiments, the first insulating pattern Pta1 may be made of the same material as the first organic pattern 250.

Like the first pixels Pxa, each of the second pixels Pxb may include a second thin film transistor Tb located on the first base substrate 110, the protective layer 180 located on the second thin film transistor Tb, a first insulating pattern Ptb1 and a second insulating pattern Ptb2 that are located on the protective layer 180, and a second pixel electrode (not illustrated) that is located on the first insulating pattern Ptb1 and electrically connected to the second thin film transistor Tb.

The second insulating pattern Ptb2 of each of the second pixels Pxb may include a second organic pattern 270, and the second organic pattern 270 may overlap the second thin film transistor Tb. In some embodiments, the second insulating pattern Ptb2 of each of the second pixels Pxb may be made of the same material as the second organic pattern 270.

In some embodiments, at least one of the second insulating pattern Pta2 of each of the first pixels Pxa and the second insulating pattern Ptb2 of each of the second pixels Pxb may be omitted.

Like the first pixels Pxa and the second pixels Pxb, each of the third pixels Pxc may include a third thin film transistor Tc located on the first base substrate 110, the protective layer 180 located on the third thin film transistor Tc, a first insulating pattern Ptc1 and a second insulating pattern Ptc2 that are located on the protective layer 180, and a third pixel electrode (not illustrated) that is located on the first insulating pattern Ptc1 and electrically connected to the third thin film transistor Tc.

Some of the third pixels Pxc may be located in the double exposure area DEA of the display area DA of the first base substrate 110. Of the third pixels Pxc, a pixel that is located in the double exposure area DEA and relatively located on a left side of the drawing will be referred to as a first specific pixel Pxc1, and a second insulating pattern included in the first specific pixel Pxc1 will be referred to as a first specific insulating pattern Ptc21. In addition, among the third pixels Pxc, a pixel that located in the same pixel row as the first specific pixel Pxc1, located in the double exposure area DEA, and relatively located on a right side of the drawing will be referred to as a second specific pixel Pxc2, and a second insulating pattern included in the second specific pixel Pxc2 will be referred to as a second specific insulating pattern Ptc22.

The first specific insulating pattern Ptc21 may include a first specific organic pattern 230*a* located on the protective layer 180 and a third specific organic pattern 311 located on the first specific organic pattern 230*a*. In some embodiments, the first specific organic pattern 230*a* may overlap the third thin film transistor Tc of the first specific pixel Pxc1. In some embodiments, the first specific organic pattern 230*a* may be made of the same material as the first insulating pattern Ptc1 of the first specific pixel Pxc1.

The second specific insulating pattern Ptc22 may include a second specific organic pattern 230*b* located on the protective layer 180 and a fourth specific organic pattern 313 located on the second specific organic pattern 230*b*. In some embodiments, the second specific organic pattern 230*b* may overlap the third thin film transistor Tc of the second specific pixel Pxc2. The second specific organic pattern 230*b* may be made of the same material as the first insulating pattern Ptc1 of the second specific pixel Pxc2.

In some embodiments, the second specific organic pattern 230*b* may be made of the same material as the first specific organic pattern 230*a*. In addition, the third specific organic pattern 311 may be made of the same material as the fourth specific organic pattern 313. In addition, the third specific organic pattern 311 and the fourth specific organic pattern 313 may be made of the same material as the first organic pattern 250 or the second organic pattern 270. For ease of description, a case where the third specific organic pattern 311 and the fourth specific organic pattern 313 are made of the same material as the first organic pattern 250 will be described below as an example.

The first organic pattern 250, the second organic pattern 270, the first specific organic pattern 230*a*, the second specific organic pattern 230*b*, the third specific organic pattern 311, and the fourth specific organic pattern 313 may include a photosensitive material. The photosensitive material may be a photosensitive organic material. In some embodiments, the photosensitive organic material may include a negative photosensitive material whose portion exposed to light is cured or a positive photosensitive material whose portion unexposed to light is cured. For ease of description, a case where the photosensitive organic material is a negative photosensitive material will be described below as an example.

In some embodiments, the third specific organic pattern 311, the fourth specific organic pattern 313, and the first organic pattern 250 may include a colorant of the first color that transmits light of a first color wavelength, the second organic pattern 270 may include a colorant of the second color that transmits light of a second color wavelength that is different from the first color wavelength, and the first specific organic pattern 230*a* and the second specific organic pattern 230*b* may include a colorant of the third color that transmits light of a third color wavelength that is different from the first color wavelength and the second color wavelength. In an embodiment, the first color may be any one of red, green and blue, the second color may be another one of red, green and blue, and the third color may be the remaining one of red, green and blue.

The first specific organic pattern 230*a* may include a first portion 231*a* and a second portion 233*a*. The first portion 231*a* may be located on the protective layer 180 and may overlap the third thin film transistor Tc of the first specific pixel Pxc1. The second portion 233*a* may be located on the first portion 231*a* and may protrude toward the counter substrate 800.

The second specific organic pattern 230*b* may include a third portion 231*b* and a fourth portion 233*b*. The third portion 231*b* may be located on the protective layer 180 and may overlap the third thin film transistor Tc of the second specific pixel Pxc2. The fourth portion 233*b* may be located on the third portion 231*b* and may protrude toward the counter substrate 800.

In some embodiments, each of the second portion 233a and the fourth portion 233b may be an island shape in a plan view. That is, the second portion 233a may be an island-shaped pattern formed on the first portion 231a, and the fourth portion 233b may be an island-shaped pattern formed on the third portion 231b.

The first portion 231a of the first specific organic pattern 230a may be divided into a first non-overlap portion 2311a not overlapping the second portion 233a and a first overlap portion 2313a overlapping the second portion 233a. The hardness of the first non-overlap portion 2311a may be relatively lower than the hardness of the first overlap portion 2313a. The first overlap portion 2313a may be a portion exposed to light twice, i.e., a double exposed portion, and the first non-overlap portion 2311a may be a portion exposed to light once, i.e., a single exposed portion. Since the first overlap portion 2313a has been exposed to light more than the first non-overlap portion 2311a, it may have a greater hardness than the first non-overlap portion 2311a. That is, the first overlap portion 2313a may be relatively harder than the first non-overlap portion 2311a.

In some embodiments, the second portion 233a may have a relatively greater hardness than the first non-overlap portion 2311a of the first portion 231a. Like the first overlap portion 2313a, the second portion 233a may have been exposed to light more than the first non-overlap portion 2311a. Accordingly, the second portion 233a may be relatively harder than the first non-overlap portion 2311a.

Similarly, the third portion 231b of the second specific organic pattern 230b may be divided into a second non-overlap portion 2311b not overlapping the fourth portion 233b and a second overlap portion 2313b overlapping the fourth portion 233b. The hardness of the second non-overlap portion 2311b may be relatively lower than the hardness of the second overlap portion 2313b. The second overlap portion 2313b may be a double exposed portion, and the second non-overlap portion 2311b may be a single exposed portion. Therefore, the second overlap portion 2313b may have a greater hardness than the second non-overlap portion 2311b.

In some embodiments, the fourth portion 233b may have a relatively greater hardness than the second non-overlap portion 23111b of the third portion 231b.

The first portion 231a and the second portion 233a of the first specific organic pattern 230a may be made of the same material as the third portion 231b and the fourth portion 233b of the second specific organic pattern 230b. In addition, the first overlap portion 2313a of the first portion 231a, the second portion 233a, the second overlap portion 2313b of the third portion 231b, and the fourth portion 233b may be double exposed portions. In some embodiments, the first overlap portion 2313a of the first portion 231a, the second portion 233a, the second overlap portion 2313b of the third portion 231b, and the fourth portion 233b may have substantially the same hardness. In addition, single exposed portions including the first non-overlap portion 2311a of the first portion 231a and the second non-overlap portion 2311b of the third portion 231b may have substantially the same hardness.

In some embodiments, a width W11 of the first portion 231a of the first specific organic pattern 230a measured along the first direction D1 may be smaller than a width W21 of the third portion 231b of the second specific organic pattern 230b measured along the first direction D1. This difference in width between the first portion 231a and the third portion 231b may be caused by sagging of a mask during an exposure process. For example, a portion of the mask corresponding to the first portion 231a may be sagging at the time of forming the first portion 231a, and a portion of the mask corresponding to the third portion 231b may be normal (e.g., not sagging) at the time of forming the third portion 231b.

In some embodiments, a width W12 of the second portion 233a of the first specific organic pattern 230a measured along the first direction D1 may be greater than a width W22 of the fourth portion 233b of the second specific organic pattern 230b measured along the first direction D1. This difference in width between the second portion 233a and the fourth portion 233b may be caused by sagging of the mask during the exposure process.

The width W12 of the second portion 233a may be greater than the width W22 of the fourth portion 233b. Therefore, a width of the first overlap portion 2313a overlapping the second portion 233a may be greater than a width of the second overlap portion 2313b overlapping the fourth portion 233b.

During a mask split exposure process, steps may be formed in patterns within pixels due to, for example, mask sagging at a boundary of an exposure area. Accordingly, a cell gap between the array substrate 100 and the counter substrate 800 may change at the boundary of the exposure area. Since the thickness of the liquid crystal layer LC can determine transmittance of light passing through the liquid crystal layer LC, a change in the cell gap at the boundary of the exposure area can cause deterioration of display quality.

In the current embodiment, however, the first specific organic pattern 230a and the second specific organic pattern 230b are formed through double exposure. Therefore, it is possible to prevent or minimize steps of organic patterns at the boundary of the exposure area, prevent a change in the cell gap, prevent deterioration of display quality, and provide a display device with improved reliability.

The first circuit parts 510 may be located in the peripheral area PA of the first base substrate 110. The protective layer 180 may be located on the first circuit parts 510, and the first peripheral patterns Pt1 may be located on the protective layer 180.

The first circuit parts 510 may be driver circuits, for example, gate driver circuits and may be located in the peripheral area PA on one side of the display area DA. In some embodiments, the first circuit parts 510 may have an amorphous silicon gate (ASG) structure. An exemplary structure of the first circuit parts 510 will be described later with reference to FIGS. 5 and 6.

The first peripheral patterns Pt1 may overlap the first circuit parts 510, respectively. When a first peripheral pattern Pt1 overlaps a first circuit part 510, it may denote that the first peripheral pattern Pt1 is located on at least a portion of a material layer or a pattern that forms the first circuit part 510.

Each of the first peripheral patterns Pt1 may be an island shape in a plan view. That is, the first peripheral patterns Pt1 may be island-shaped patterns located in the peripheral area PA of the first base substrate 110. When the first peripheral patterns Pt1 are island-shaped, liquid crystals injected between the array substrate 100 and the counter substrate 800 can spread more quickly and uniformly. That is, the liquid crystal spreadability of the liquid crystal layer LC can be enhanced.

Each of the first peripheral patterns Pt1 may include a first peripheral organic pattern 271 that is located on the protective layer 180 and overlaps the first circuit part 510 and a third peripheral organic pattern 315 that is located on the first peripheral organic pattern 271. In some embodiments, the first peripheral organic pattern 271 may be made of the same material as the first specific organic pattern 230a and the second specific organic pattern 230b, and the third peripheral organic pattern 315 may be made of the same material as the third specific organic pattern 311.

In some embodiments, the second circuit parts 510' may be located in the peripheral area PA on the other side of the display area DA of the first base substrate 110. The protective layer 180 may be located on the second circuit parts 510', and the second peripheral patterns Pt2 may be located on the protective layer 180. The second peripheral patterns Pt2 may overlap the second circuit parts 510', respectively.

The second circuit parts 510', like the first circuit parts 510, may be gate driver circuits and may be located on the opposite side of the display area DA from the first circuit parts 510.

Like the first peripheral patterns Pt1, each of the second peripheral patterns Pt2 may be an island shape in a plan view.

Each of the second peripheral patterns Pt2 may include a second peripheral organic pattern 273 that is located on the protective layer 180 and overlaps the second circuit part 510' and a fourth peripheral organic pattern 317 that is located on the second peripheral organic pattern 273. In some embodiments, the second peripheral organic pattern 273 may be made of the same material as the first peripheral organic pattern 271, the first specific organic pattern 230a and the second specific organic pattern 230b, and the fourth peripheral organic pattern 317 may be made of the same material as the third peripheral organic pattern 315 and the third specific organic pattern 311.

In some embodiments, a width W31 of the first peripheral organic pattern 271 measured along the first direction D1 may be greater than a width W41 of the second peripheral organic pattern 273 measured along the first direction D1. This difference in width between the first peripheral organic pattern 271 and the second peripheral organic pattern 273 may be caused by sagging of the mask during the exposure process.

In some embodiments, the first peripheral organic pattern 271 and the second peripheral organic pattern 273 may have substantially the same hardness.

While the first peripheral organic pattern 271 and the second peripheral organic pattern 273 are formed through single exposure, the first overlap portion 2313a and the second overlap portion 2313b may be formed through double exposure. Therefore, in some embodiments, the hardness of the first peripheral organic pattern 271 and the second peripheral organic pattern 273 may be lower than the hardness of the first overlap portion 2313a or the hardness of the second overlap portion 2313b. Similarly, since the second portion 233a and the fourth portion 233b are formed through double exposure, the hardness of the first peripheral organic pattern 271 and the second peripheral organic pattern 273 may be lower than the hardness of the second portion 233a or the hardness of the fourth portion 233b.

A light shielding layer 220 may be located on the first base substrate 110. The light shielding layer 220 may cover the first specific insulating pattern Ptc21, the second specific insulating pattern Ptc22, the first organic pattern 250, and the second organic pattern 270. In some embodiments, the light shielding layer 220 may further cover the first peripheral patterns Pt1 and the second peripheral patterns Pt2. In some embodiments, the light shielding layer 220 may include a light shielding pigment such as black carbon and may include a photosensitive organic material.

In some embodiments, a portion of the light shielding layer 220 that overlaps the first specific insulating pattern Ptc21 may contact the counter substrate 800. In addition, a portion of the light shielding layer 220 that overlaps the second specific insulating pattern Ptc22 may contact the counter substrate 800. That is, a portion of the light shielding layer 220 and the first specific insulating pattern Ptc21 may function as a spacer for maintaining the cell gap. Similarly, the light shielding layer 220 and the second specific insulating pattern Ptc22 may also function as a spacer for maintaining the cell gap.

The first peripheral patterns Pt1 and the light shielding layer 220 may also function as a spacer, and the second peripheral patterns Pt2 and the light shielding layer 220 may also function as a spacer. Accordingly, the cell gap can also be uniformly maintained in the peripheral area PA, and a common electrode 870 of the counter substrate 800 and the first circuit parts 510 can be prevented from contacting each other.

The counter substrate 800 will now be described.

The counter substrate 800 may include a second base substrate 810 and the common electrode 870.

Like the first base substrate 110, the second base substrate 810 may be a transparent insulating substrate. In addition, the second base substrate 810 may include polymer or plastic having high thermal resistance. In some embodiments, the second base substrate 810 may have flexibility.

The common electrode 870 may be located on a surface of the second base substrate 810 that faces the first base substrate 110. The common electrode 870 may be made of a transparent conductive material such as ITO or IZO and may be formed on the entire surface of the second base substrate 810 without distinction between pixels. A common voltage may be applied to the common electrode 870 to form an electric field together with a pixel electrode of each pixel.

Figure 5:
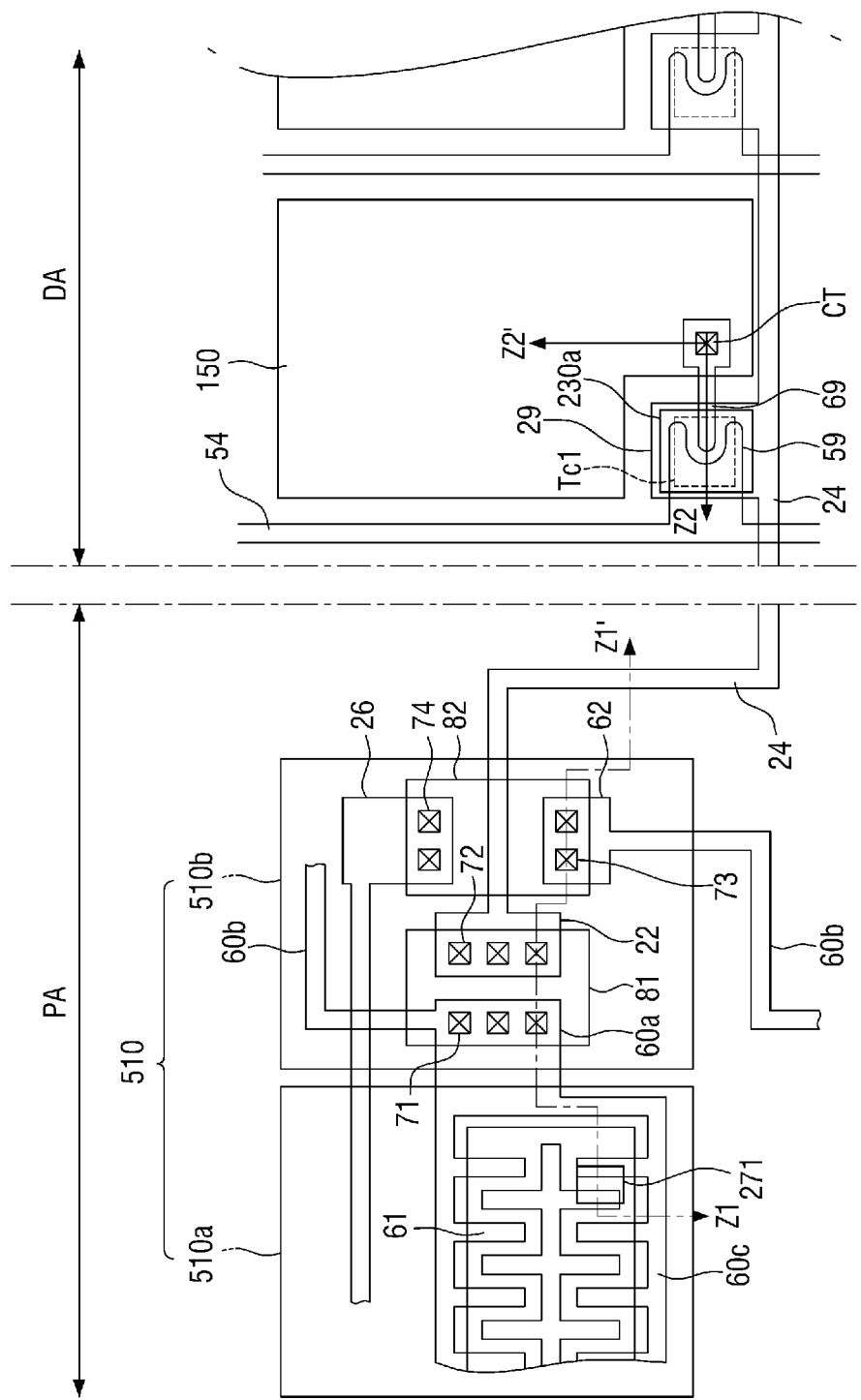
FIG. 5 is a partial plan view of the array substrate in a case where a circuit part of FIG. 2 has an amorphous silicon gate (ASG) structure.
Figure 6:
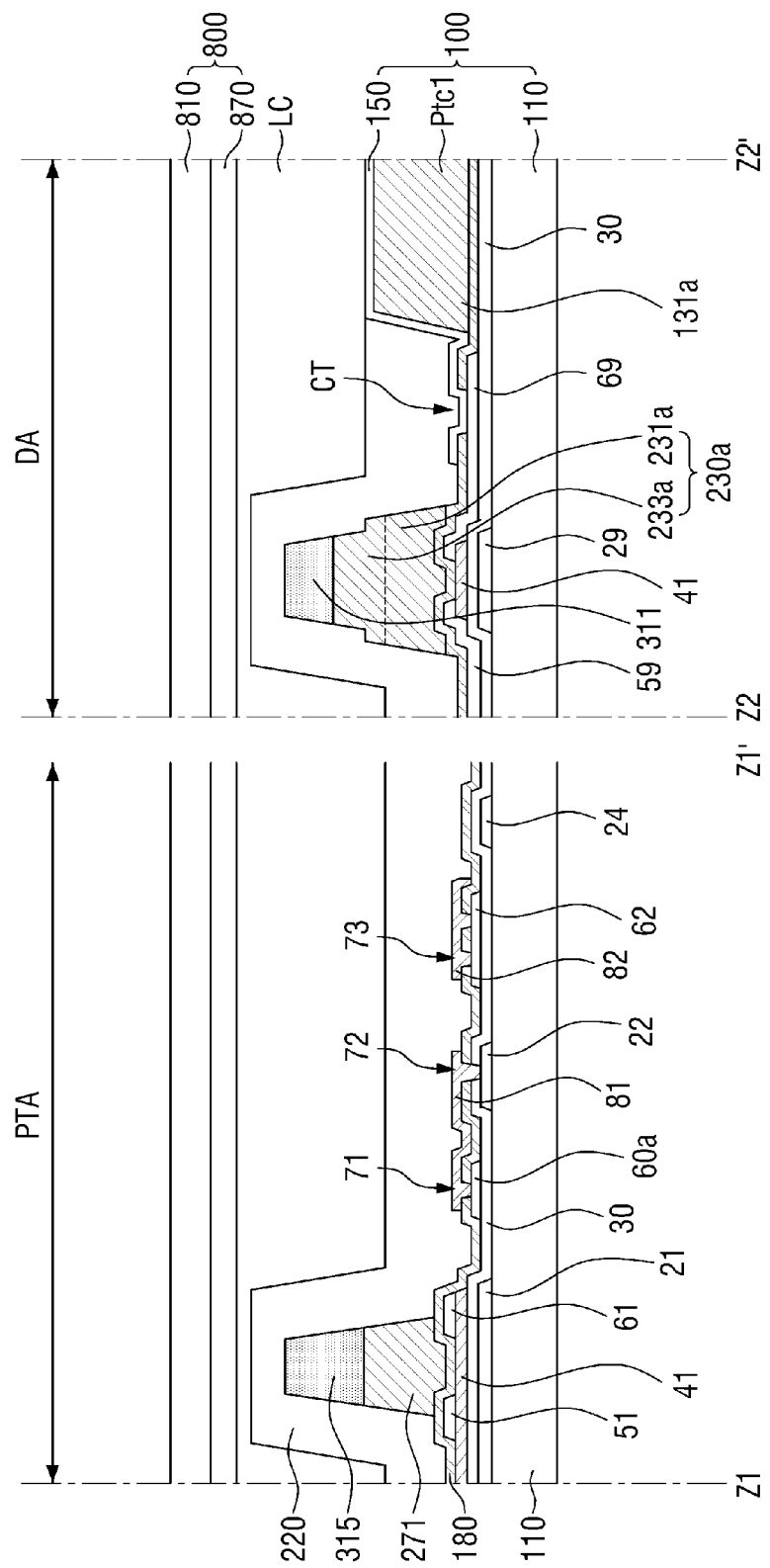
FIG. 6 is a cross-sectional view illustrating an exemplary structure of the display device, taken along the lines Z1-Z1' and Z2-Z2' of FIG. 5.

FIG. 5 is a partial plan view of the array substrate 100 in a case where the first circuit part 510 of FIG. 2 has an ASG structure. FIG. 6 is a cross-sectional view illustrating an exemplary structure of the display device 1, taken along the lines Z1-Z1' and Z2-Z2' of FIG. 5.

Referring to FIGS. 5 and 6, the gate driver circuit of the first circuit part 510 may include a source electrode contact portion 60a, a gate line contact portion 22, a first source or drain line 60b, a first pad 62, a second pad 26, a gate line 24, a first bridge line 81, and a second bridge line 82.

In addition, a thin film transistor of each pixel, for example, the third thin film transistor Tc of the first specific pixel Pxc1 may include a gate electrode 29, a semiconductor layer 41, a source electrode 59 and a drain electrode 69.

The third thin film transistor Tc will first be described below.

The gate electrode 29 may be located on the first base substrate 110, may be connected to the gate line 24 located on the first base substrate 110, and may extend from the gate line 24.

A gate insulating layer 30 may be located on the gate line 24 and the gate electrode 29. The gate insulating layer 30 may be made of an insulating material such as silicon nitride or silicon oxide.

The semiconductor layer 41 may be located on the gate insulating layer 30, and at least a portion of the semiconductor layer 41 may overlap the gate electrode 29. The semiconductor layer 41 may include amorphous silicon, polycrystalline silicon, or an oxide semiconductor.

A data line 54 that intersects the gate line 24 may be located on the gate insulating layer 30. The data line 54 may deliver a data signal.

The source electrode 59 may branch from the data line 54, and at least a portion of the source electrode 59 may overlap the gate electrode 29.

The drain electrode 69 may be spaced apart from the source electrode 59 with the semiconductor layer 41 interposed between the drain electrode 69 and the source electrode 59, and at least a portion of the drain electrode 69 may overlap the gate electrode 29.

The gate electrode 29, the source electrode 59 and the drain electrode 69 may constitute one thin film transistor, for example, the third thin film transistor Tc together with the semiconductor layer 41, and a channel of the third thin film transistor Tc is formed in the semiconductor layer 41 between the source electrode 59 and the drain electrode 69.

The protective layer 180 may be located on the third thin film transistor Tc. and a contact hole CT may be formed through the protective layer 180 to expose a portion of the drain electrode 69.

The first specific organic pattern 230a and the third specific organic pattern 311 that overlaps the third thin film transistor Tc may be located on the protective layer 180. In addition, the first insulating pattern Ptc1 that does not overlap the third thin film transistor Tc may be located on the protective layer 180.

A pixel electrode 150 may be located on the protective layer 180 and the first insulating pattern Ptc1. The pixel electrode 150 may be connected to the drain electrode 69 exposed through the contact hole CT.

The first circuit part 510 will now be described.

The source electrode contact portion 60a may be connected to a second source or drain line 60c of a gate signal transmission transistor of the gate driver circuit. Here, the second source or drain line 60c may extend toward the display area DA and integrated with the source electrode contact portion 60a. A first source or drain line 60b may be connected to the source electrode contact portion 60a. Therefore, a gate output signal provided by a first source electrode 61 of the gate signal transmission transistor can be transmitted to a preceding stage.

The source electrode contact portion 60a and the gate line contact portion 22 may be connected to each other. Therefore, the gate output signal provided by the first source electrode 61 can be transmitted to a thin film transistor formed in each pixel of the display area DA, for example, to the gate electrode 29 of the third thin film transistor Tc of the first specific pixel Pxc1. The source electrode contact portion 60a may be formed on the gate insulating layer 30, and the gate line contact portion 22 may be formed under the gate insulating layer 30. However, the source electrode contact portion 60a and the gate line contact portion 22 can be electrically connected to each other by the first bridge line 81.

The protective layer 180 may be formed on the source electrode contact portion 60a and the gate insulating layer 30. The protective layer 180 may be formed by depositing silicon oxide or silicon nitride, but may be omitted in some embodiments.

First holes 71 may be formed through the protective layer 180 to expose a portion of the source electrode contact portion 60a, and second holes 72 may be formed through the protective layer 180 and the gate insulating layer 30 to expose a portion of the gate line contact portion 22, so that the source electrode contact portion 60a and the gate line contact portion 22 can be connected to each other by the first bridge line 81. Here, the first bridge line 81 may be formed on the protective layer 180.

The gate line 24 may be connected to the gate line contact portion 22. Therefore, the gate output signal transmitted from the source electrode contact portion 60a through the first bridge line 81 may be delivered to the gate electrode 29 through the gate line 24.

As illustrated in FIGS. 5 and 6, the first pad 62 may be connected to the first source or drain line 60b of a following stage to receive a gate output signal of the following stage. The first pad 62 may be located on a side of the gate line 24, and the second pad 26 may be located on the other side of the gate line 24 in the second direction D2. The second pad 26 may be connected to the first pad 62 to receive the gate output signal of the following stage. Here, the first pad 62 and the second pad 26 may be electrically connected by the second bridge line 82. The first pad 62 may be formed on the gate insulating layer 30, and the second pad 26 may be formed under the gate insulating layer 30.

That is, the second pad 26 may be formed on the same layer as the gate electrode 29. The protective layer 180 may be formed on the first pad 62, and the gate insulating layer 30 and the protective layer 180 may be formed on the second pad 26. Therefore, to connect the first pad 62 and the second pad 26 to the second bridge line 82, third holes 73 may be formed on the first pad 62, and fourth holes 74 may be formed on the second pad 26. The first and second pads 62 and 26 may be connected to the second bridge line 82 by the third and fourth holes 73 and 74, respectively. Here, the second bridge line 82 may be formed on the protective layer 180.

As illustrated in FIG. 5, the first circuit part 510 may include a contact region 510b and a wiring region 510a. The first peripheral organic pattern 271 and the like may be formed in the wiring region 510a not to overlap the first through fourth holes 71 through 74 formed in the contact region 510b.

Here, the contact region 510b may correspond to a region in which the first through fourth holes 71 through 74 for electrically connecting wirings formed in the gate driver circuit are densely formed. Contact portions for electrical connection between wiring layers may also be formed in the wiring region 510a. However, those contact portions are formed relatively more densely in the contact region 510b than in the wiring region 510a.

Since the first peripheral organic pattern 271 is disposed not to overlap the contact region 510b or the first through fourth holes 71 through 74, a process of forming holes in the first circuit part 510 becomes easier.

The structure of the second circuit part 510' may be substantially the same as or similar to that of the first circuit part 510, and thus a detailed description of the structure of the second circuit part 510' will be omitted.

Figure 7:
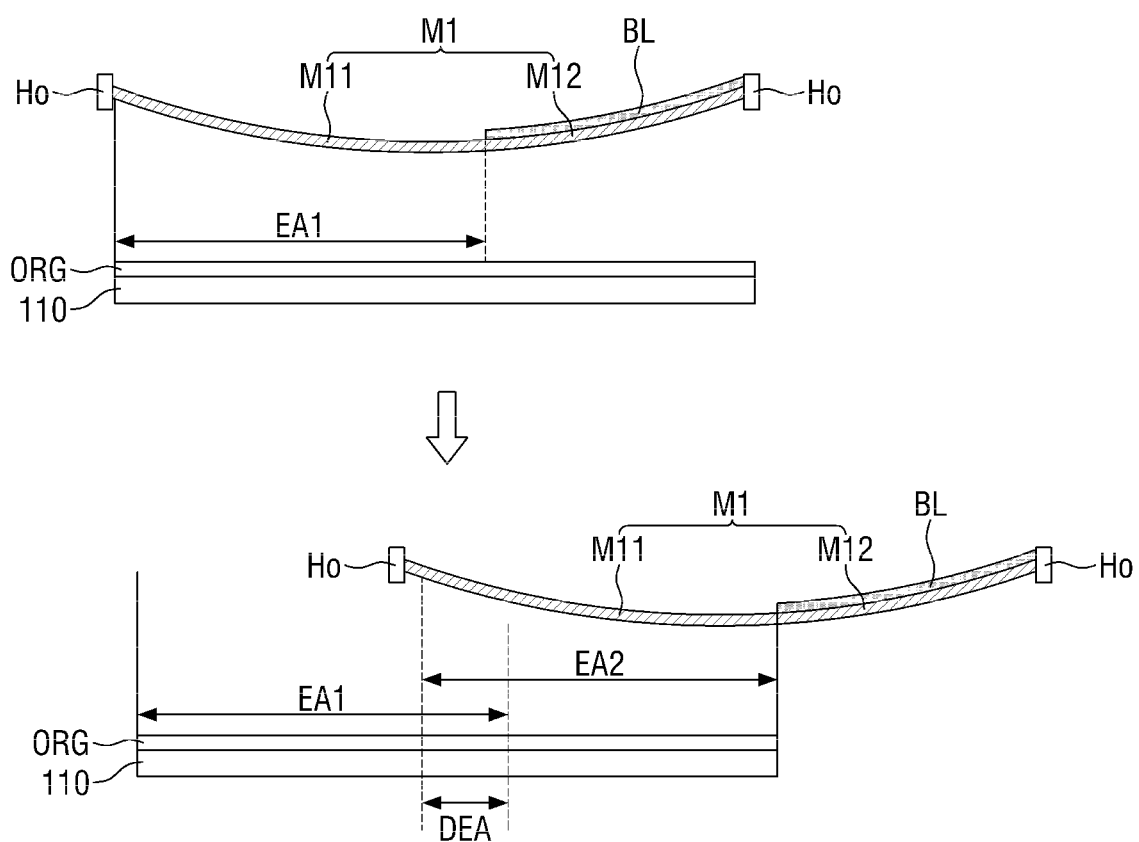
FIG. 7 is a view illustrating split exposure performed using a mask in a display device manufacturing process according to an embodiment.
Figure 8:
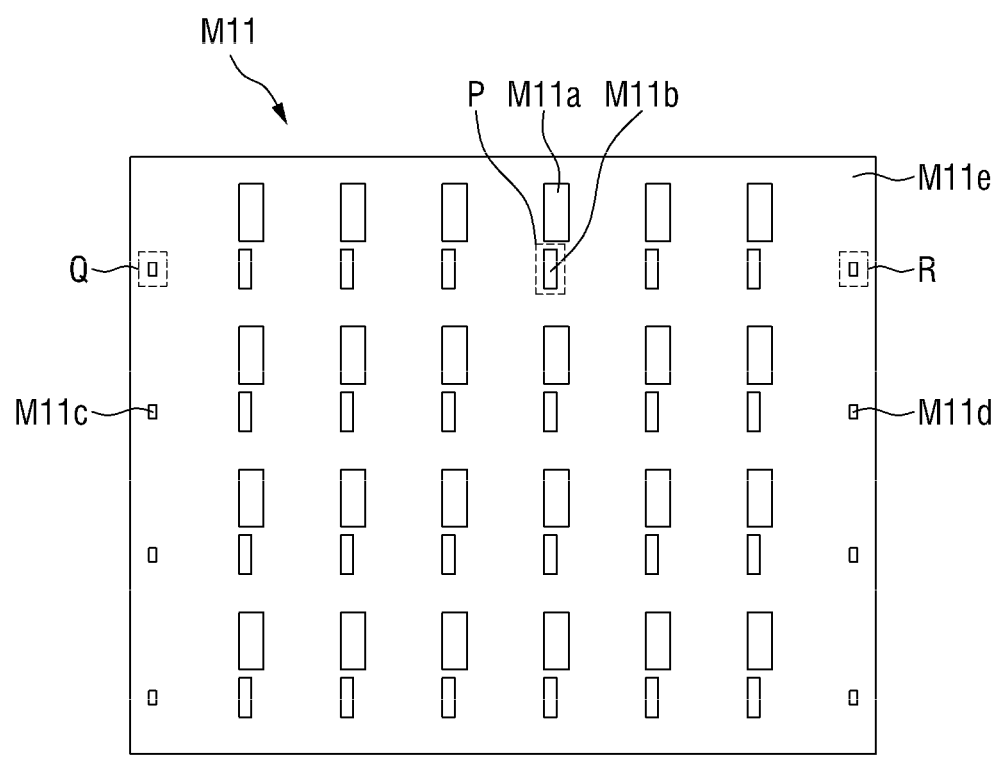
FIG. 8 is a plan view illustrating an exemplary structure of a first mask pattern portion of the mask of FIG. 7, more specifically, a plan view of the first mask pattern portion for forming organic patterns of third pixels illustrated in FIG. 1.
Figure 9:
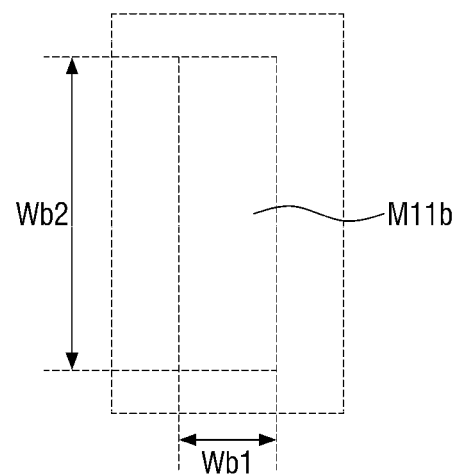
FIG. 9 is an enlarged plan view of a portion 'P' of FIG. 8.
Figure 10:
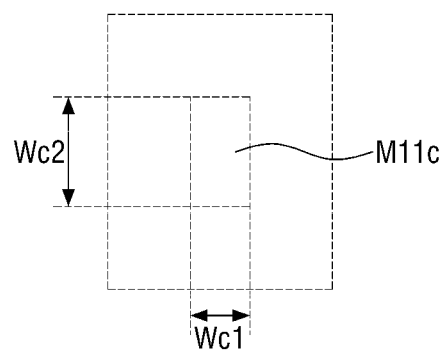
FIG. 10 is an enlarged plan view of a portion 'Q' of FIG. 8.
Figure 11:
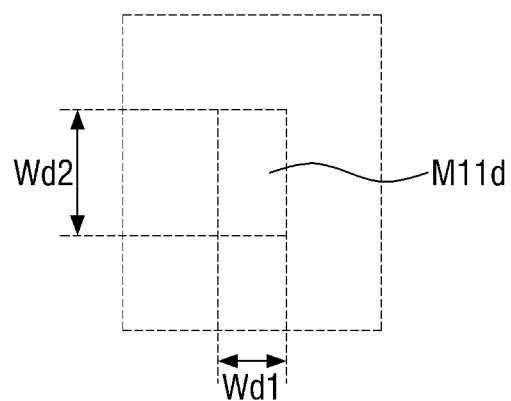
FIG. 11 is an enlarged plan view of a portion 'R' of FIG. 8.

FIG. 7 is a view illustrating split exposure performed using a mask M1 in a display device manufacturing process according to an embodiment. FIG. 8 is a plan view illustrating an exemplary structure of a first mask pattern portion M11 of the mask M1 of FIG. 7, more specifically, a plan view of the first mask pattern portion M11 for forming organic patterns of the third pixels Pxc illustrated in FIG. 1. FIG. 9 is an enlarged plan view of a portion 'P' of FIG. 8. FIG. 10 is an enlarged plan view of a portion 'Q' of FIG. 8. FIG. 11 is an enlarged plan view of a portion 'R' of FIG. 8.

Referring to FIG. 7, the mask M1 used to manufacture the display device 1 may include the first mask pattern portion M11 and a second mask pattern portion M12. In the process of manufacturing the display device 1, only the first mask pattern portion M11 may be used. That is, the second mask pattern portion M12 may be covered by, for example, a light shielding member BL.

First, an organic layer ORG is formed on the first base substrate 110, and the first mask pattern portion M11 is placed above the organic layer ORG. Then, a first exposure process is performed on a portion of the organic layer ORG. Next, the mask M1 is moved to the right, and a second exposure process is performed on another portion of the organic layer ORG using the first mask pattern portion M11. The first exposure area EA1 where the first exposure process is performed and the second exposure area EA2 where the second exposure process is performed may partially overlap each other, and this overlap area may correspond to the double exposure area DEA illustrated in FIGS. 1 and 2.

Both ends Ho of the mask M1 may be supported during the exposure, but a center portion of the mask M1 may sag downwardly due to gravity. Therefore, while a portion of the first mask pattern portion M11 that is relatively located on the left side of the drawing may not sag, a portion of the first mask pattern portion M11 that is relatively located on the right side may sag downwardly.

Referring to FIGS. 8 through 11, the first mask pattern portion M11 may include first patterns M11a corresponding to the first insulating patterns Ptc1 of the third pixels Pxc, second patterns M11b corresponding to the second insulating patterns Ptc2 of the third pixels Pxc, third patterns M11c corresponding to the first peripheral patterns Pt1, fourth patterns M11d corresponding to the second peripheral patterns Pt2, and a light shielding portion M11e.

In some embodiments, a horizontal width Wb1 of each of the second patterns M11b may be greater than a horizontal width Wc1 of each of the third patterns M11c and a horizontal width Wd1 of each of the fourth patterns M11d. In addition, a vertical width Wb2 of each of the second patterns M11b may be greater than a vertical width Wc2 of each of the third patterns M11c and a vertical width Wd2 of each of the fourth patterns M11d. In some embodiments, the horizontal width Wc1 of each of the third patterns M11c and the horizontal width Wd1 of each of the fourth patterns M11d may be substantially equal, and the vertical width Wc2 of each of the third patterns M11c and the vertical width Wd2 of each of the fourth patterns M11d may be substantially equal.

FIGS. 12 through 19 are views illustrating a process of manufacturing the display device 1 using a mask having the first mask pattern portion M11 of FIG. 8.

Figure 12:
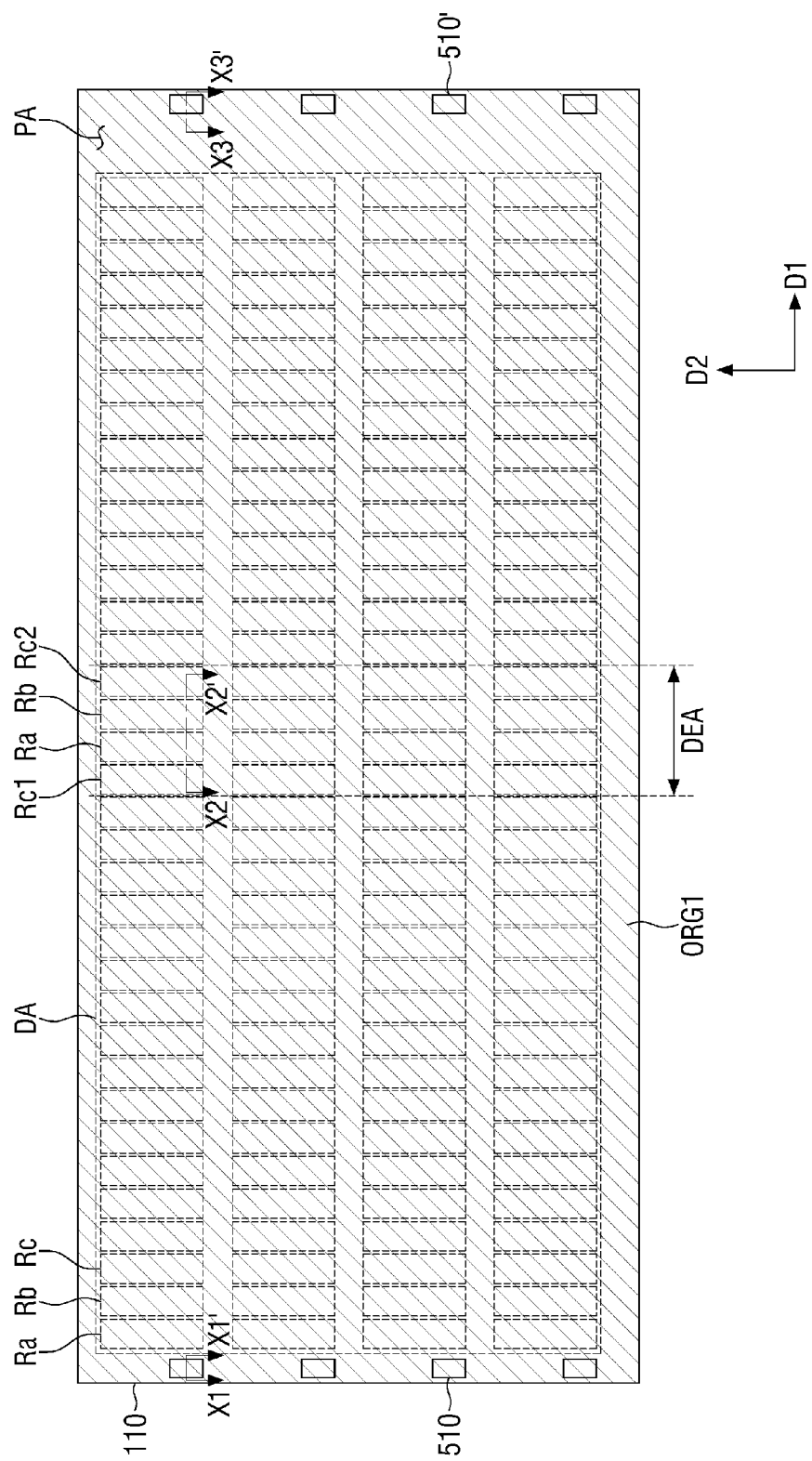
FIGS. 12 through 19 are views illustrating a process of manufacturing a display device using a mask having the first mask pattern portion of FIG. 8.
Figure 13:
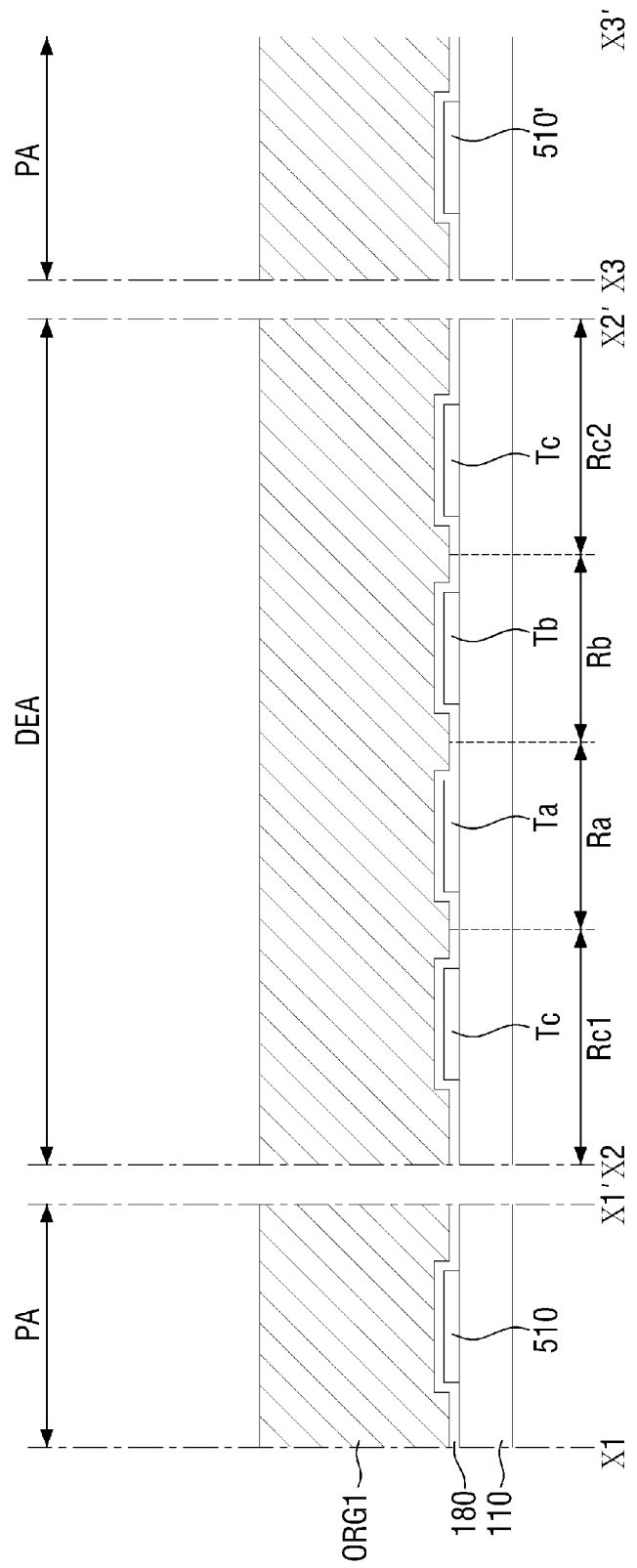

Referring to FIGS. 12 and 13, a first base substrate 110 including a display area DA and a peripheral area PA is prepared.

The display area DA may have a plurality of first pixel regions Ra, a plurality of second pixel regions Rb, and a plurality of third pixel regions Rc. Here, the first pixel regions Ra are regions where first pixels Pxa are to be located, the second pixel regions Rb are regions where second pixels Pxb are to be located, and the third pixel regions Rc are regions where third pixels Pxc are to be located.

The third pixel regions Rc may include first specific pixel regions Rc1 and second specific pixel regions Rc2. Each of the first specific pixel regions Rc1 is a region where a first specific pixel Pxc1 is to be located, and each of the second specific pixel regions Rc2 is a region where a second specific pixel Pxc2 is to be located.

First circuit parts 510 and second circuit parts 510' may be located in the peripheral area PA.

A first thin film transistor Ta may be located in each of the first pixel regions Ra, a second thin film transistor Tb may be located in each of the second pixel regions Rb, and a third thin film transistor Tc may be located in each of the third pixel regions Rc.

Next, a first photosensitive material layer ORG1 is formed on the first base substrate 110. The first photosensitive material layer ORG1 may be formed not only in the display area DA of the first base substrate 110 but also in the peripheral area PA of the first base substrate 110. That is, the first photosensitive material layer ORG1 may be formed on the entire surface of the first base substrate 110 and cover the first thin film transistors Ta, the second thin film transistors Tb, the third thin film transistors Tc, the first circuit parts 510 and the second circuit parts 510'. The first photosensitive material layer ORG1 may include a photosensitive material and may include a colorant of a first color. The photosensitive material may be a negative photosensitive material.

Figure 14:
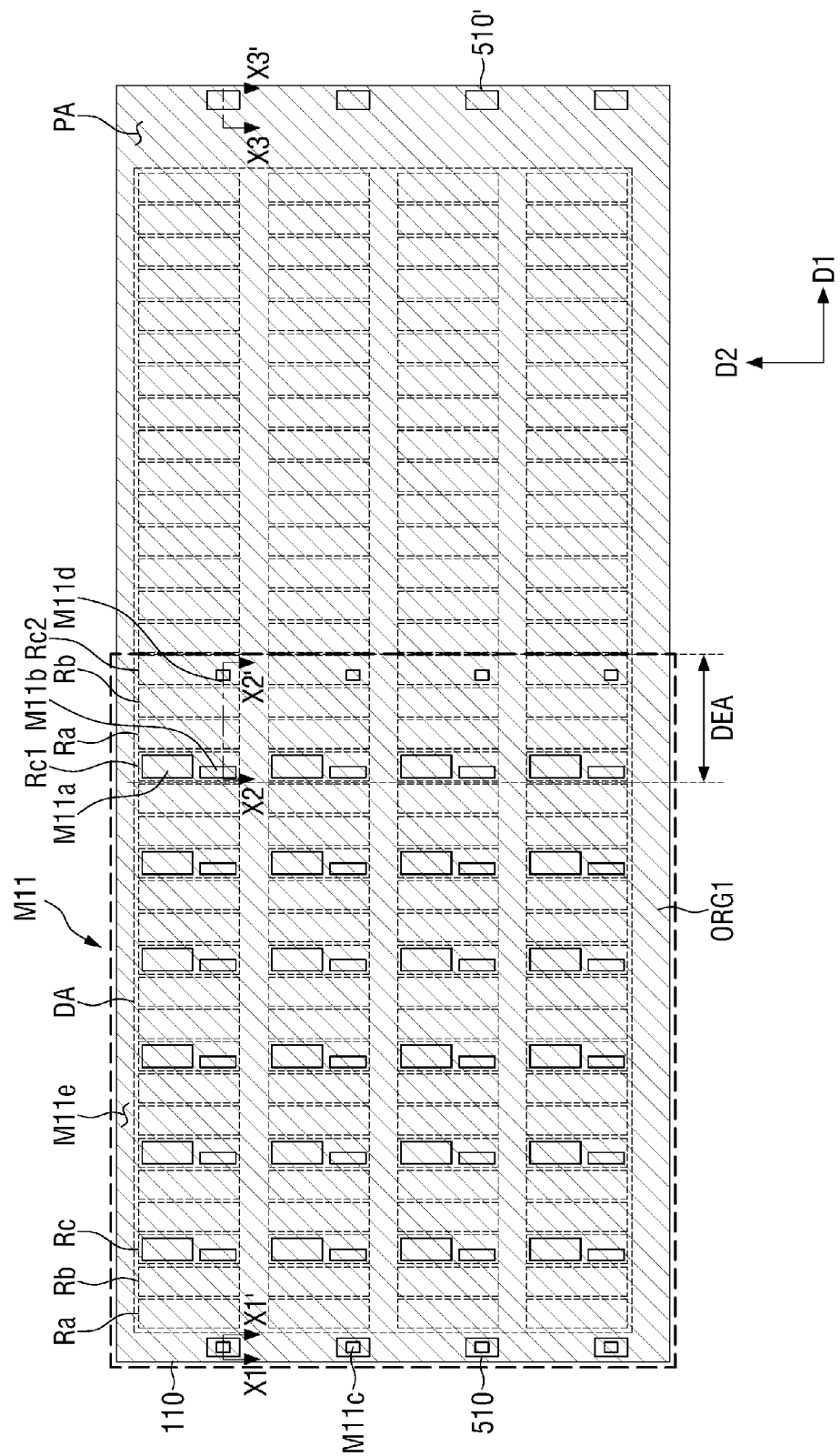
Figure 15:
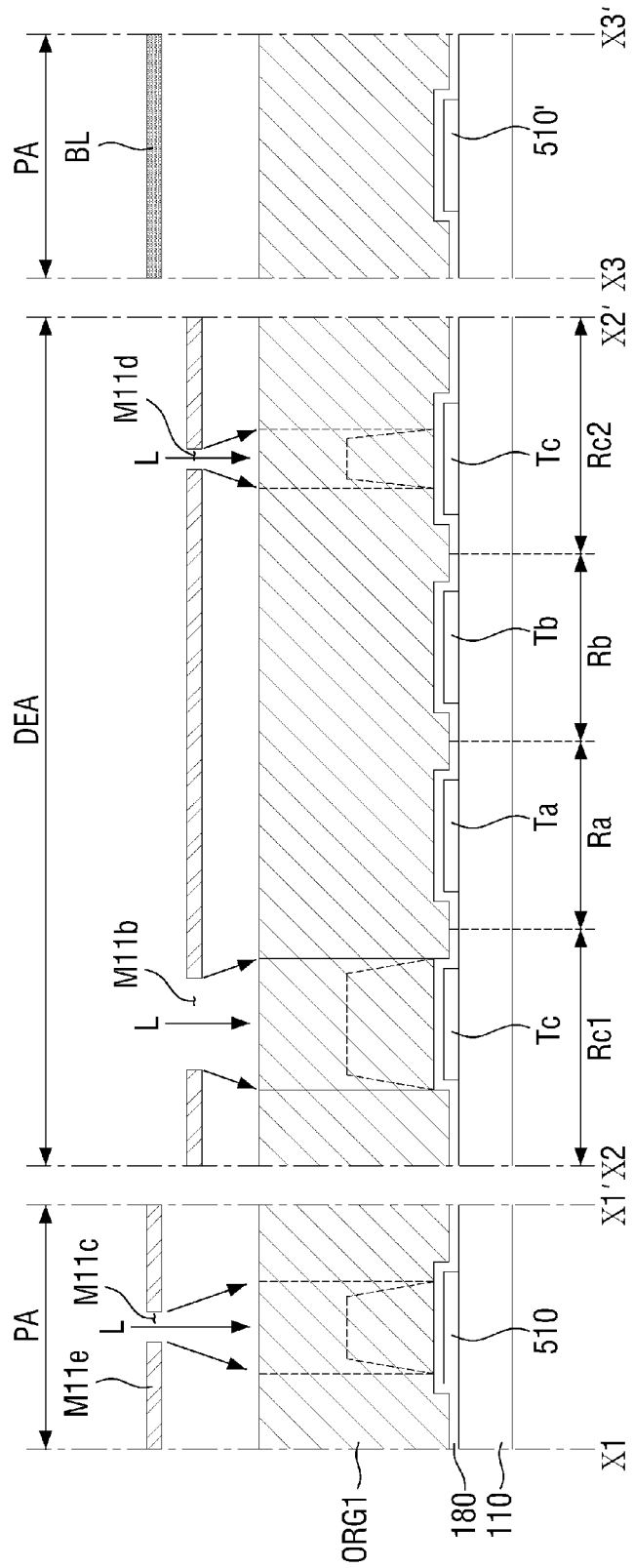

Next, referring to FIGS. 14 and 15, the first mask pattern portion M11 is placed above the first base substrate 110.

The first patterns M11a and the second patterns M11b are placed to correspond to the first specific pixel regions Rc1, the third patterns M11c are placed to correspond to the first circuit parts 510, and the fourth patterns M11d are placed to correspond to the second specific pixel regions Rc2. In addition, a portion of the first base substrate 110 that does not overlap the first mask pattern portion M11 is covered by the light shielding member BL.

Next, the first photosensitive material layer ORG1 is cured by irradiating light L such as ultraviolet light, toward the first base substrate 110 from above the first mask pattern portion M11. That is, a first exposure process is performed.

In the first exposure process, portions of the third patterns M11c that are located relatively on the left side of the first mask pattern portion M11 may not sag. On the other hand, portions of the first patterns M11a and the second patterns M11b that are placed to correspond to the first specific pixel regions Rc1 and portions of the fourth patterns M11d that are placed to correspond to the second specific pixel regions Rc2 may sag due to gravity. Therefore, even if the third patterns M11c and the fourth patterns M11d have substantially the same size, portions of the first photosensitive organic layer ORG1 that are exposed by the third patterns M11c and portions of the first photosensitive organic layer ORG1 that are exposed by the fourth patterns M11d may have different widths.

Figure 16:
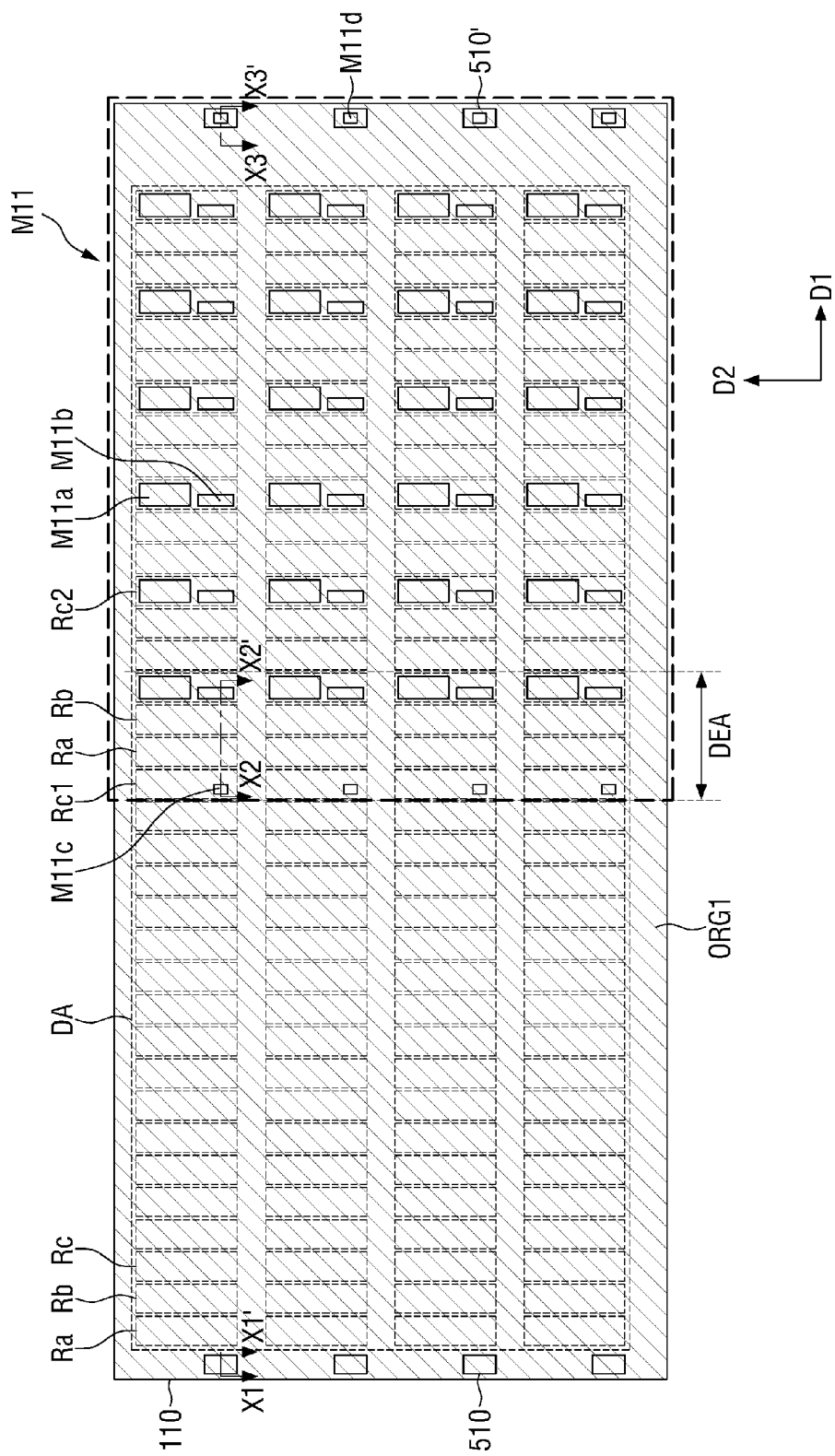
Figure 17:
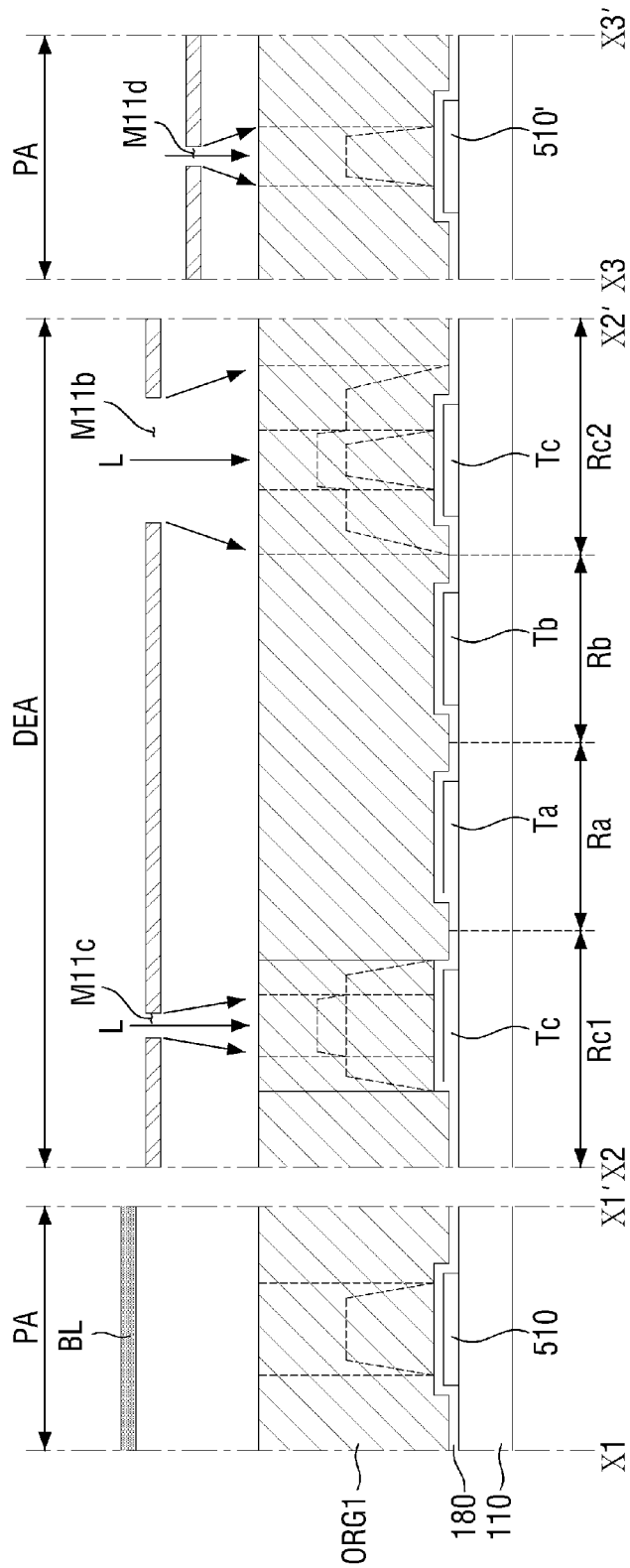
Figure 18:
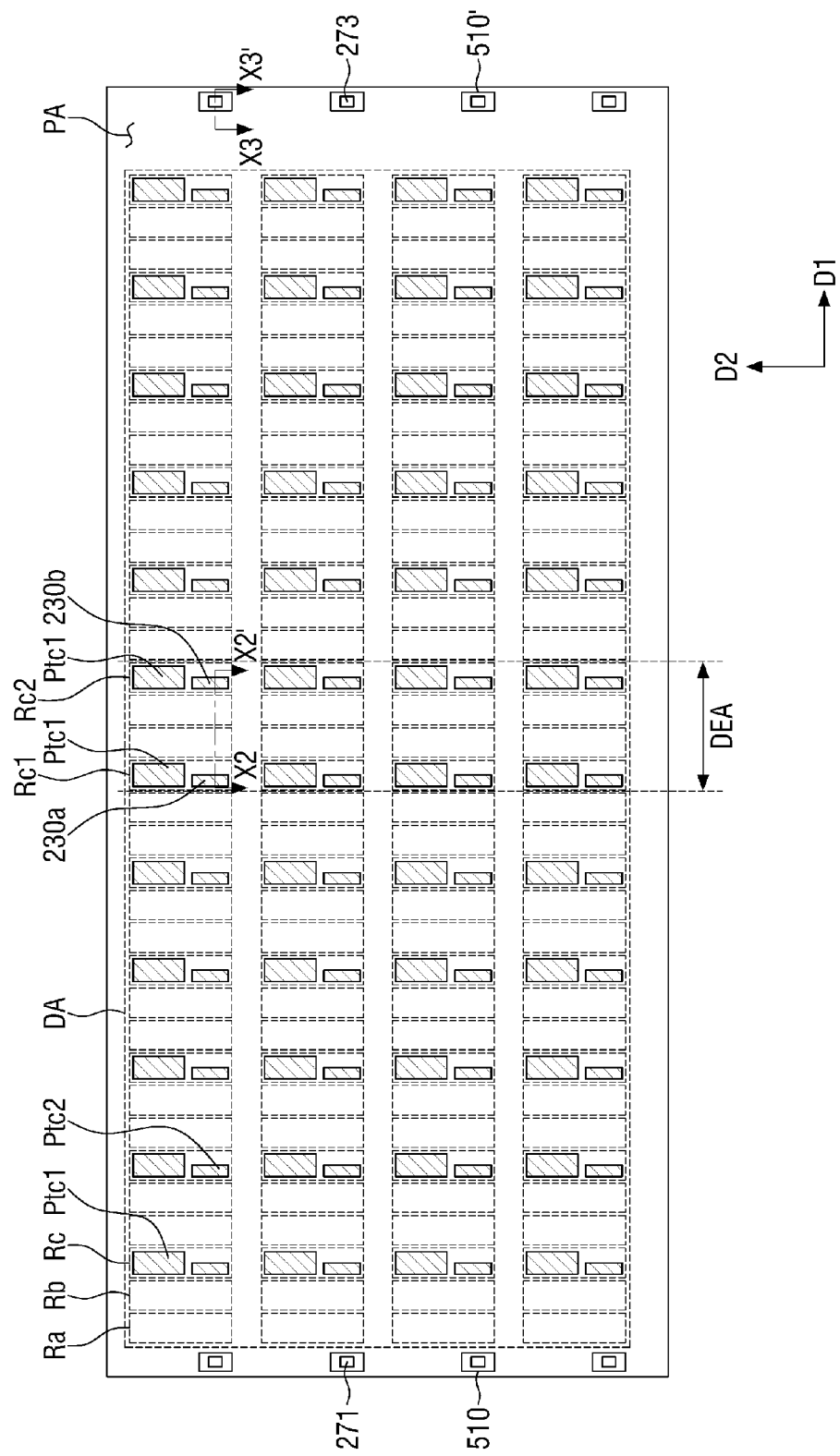

Next, referring to FIGS. 16 and 17, the first mask pattern portion M11 is moved to align some of the third pixel regions Rc that are unexposed to light with the first patterns M11a and the second patterns M11b and to align the fourth patterns M11d with the second circuit parts 510'. At this time, the third patterns M11c may be aligned with the first specific pixel regions Rc1 that are exposed to light by the first patterns M11a and the second patterns M11b in the first exposure process. In addition, at least one of the second patterns M11b may be aligned with the second specific pixel regions Rc2 that are exposed to light by the fourth patterns M11d in the first exposure process. Other portions exposed to light in the first exposure process may be covered by the light shielding member BL.

Next, the first photosensitive material layer ORG1 is cured by irradiating light L such as ultraviolet light toward the first base substrate 110 from above the first mask pattern portion M11.

Portions of the first photosensitive material layer ORG1 that are located in the first specific pixel regions Rc1 have already been exposed to light through the second patterns M11b and may be exposed once again through the third patterns M11c. That is, each of the portions of the first photosensitive material layer ORG1 that is located in the first specific pixel regions Rc1 includes a single exposed portion and a double exposed portion. Since the double exposed portion is exposed to light relatively more than the single exposed portion, it may be relatively harder than the single exposed portion.

Similarly, portions of the first photosensitive material layer ORG1 that are located in the second specific pixel regions Rc2 have already been exposed to light through the fourth patterns M11d and may be exposed once again through the second patterns M11b. That is, each of the portions of the first photosensitive material layer ORG1 that is located in the second specific pixel regions Rc2 includes a single exposed portion and a double exposed portion, and the double exposed portion may be relatively harder than the single exposed portion.

In the second exposure process, portions the third patterns M11c that are placed to correspond to the first specific pixel regions Rc1 may not sag. Similarly, portions of the second patterns M11b that are placed to correspond to the second specific pixel regions Rc2 adjacent to the third patterns M11c may not sag. On the other hand, portions of the fourth patterns M11d that are placed to correspond to the second circuit parts 510' may sag due to gravity.

Figure 19:
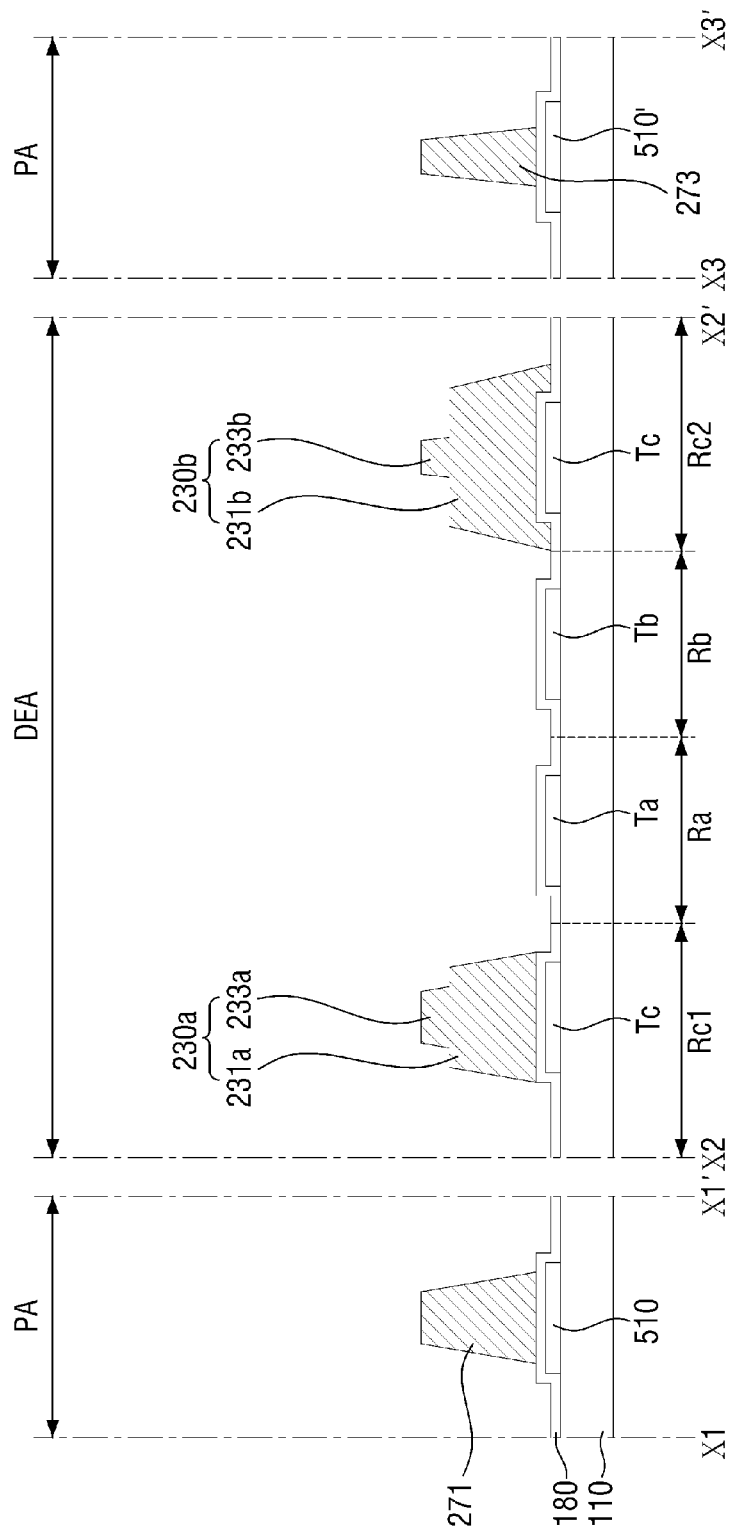

Next, uncured or unexposed portions of the first photosensitive material layer ORG1 may be removed to form the first insulating patterns Ptc1 of the third pixels Pxc as well as the first specific organic patterns 230a, the second specific organic patterns 230b, the first peripheral organic patterns 271, and the second peripheral organic patterns 273, as illustrated in FIG. 19.

The second patterns M11b corresponding to the first specific pixel regions Rc1 may sag when the first specific organic patterns 230a are formed in the first exposure process (see FIG. 15), but the second patterns M11b corresponding to the second specific pixel regions Rc2 may not sag when the second specific organic patterns 230b are formed in the second exposure process (see FIG. 17). Therefore, the first portion 231a of each of the first specific organic patterns 230a in the first specific pixel regions Rc1 may be narrower than the third portion 231b of each of the second specific organic patterns 230b in the second specific pixel regions Rc2.

The third patterns M11c corresponding to the first specific pixel regions Rc1 may not sag when the first specific organic patterns 230a are formed in the second exposure process (see FIG. 17), and the fourth patterns M11d corresponding to the second specific pixel regions Rc2 may sag when the second specific organic patterns 230b are formed in the first exposure process (see FIG. 15). Therefore, the second portion 233a of each of the first specific organic patterns 230a may be wider than the fourth portion 233b of each of the second specific organic patterns 230b.

In addition, the third patterns M11c may not sag when the first peripheral organic patterns 271 are formed in the first exposure process, and the fourth patterns M11d may sag when the second peripheral organic patterns 273 are formed in the second exposure process. Therefore, the first peripheral organic patterns 271 may be wider than the second peripheral organic patterns 273.

Next, a mask for forming the first pixels Pxa is prepared.

Figure 20:
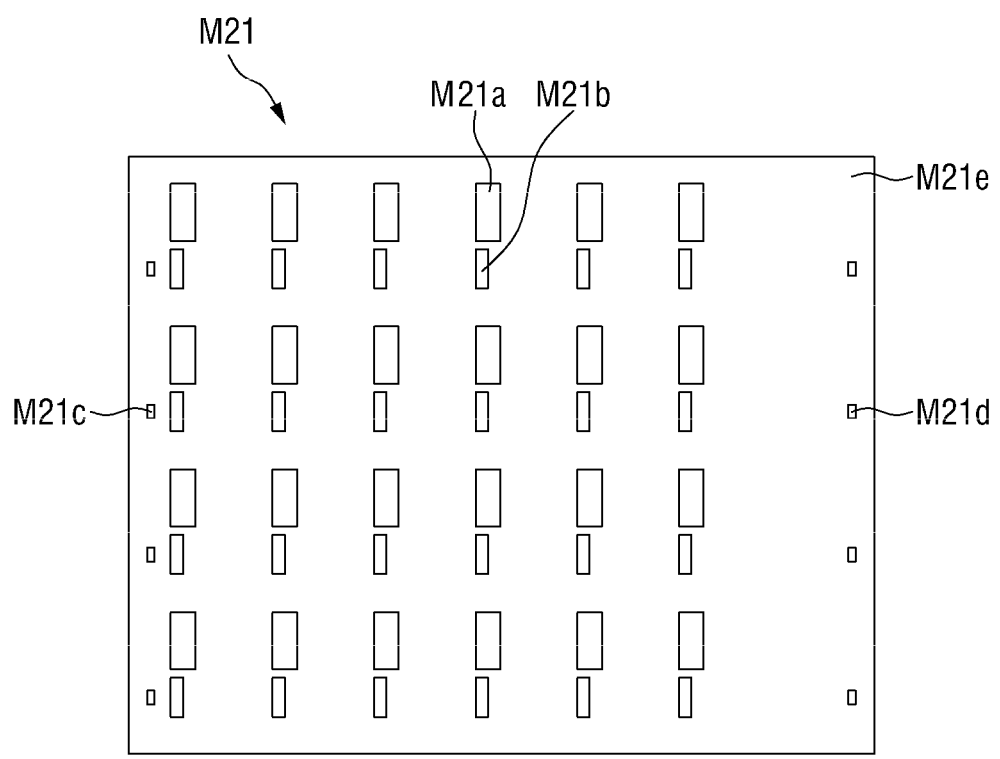
FIG. 20 is a plan view of a first mask pattern portion of a mask for forming organic patterns of first pixels illustrated in FIG. 1.

FIG. 20 is a plan view of a third mask pattern portion M21 of a mask for forming organic patterns of the first pixels Pxa illustrated in FIG. 1.

Referring to FIG. 20, the third mask pattern portion M21 for forming the first pixels Pxa may include first patterns M21a corresponding to first insulating patterns Pta1 of the first pixels Pxa, second patterns M21b corresponding to second insulating patterns Pta2 of the first pixels Pxa, third patterns M21c corresponding to the first peripheral patterns Pt1, fourth patterns M21d corresponding to the second peripheral patterns Pt2, and a light shielding portion M21e.

Figure 21:
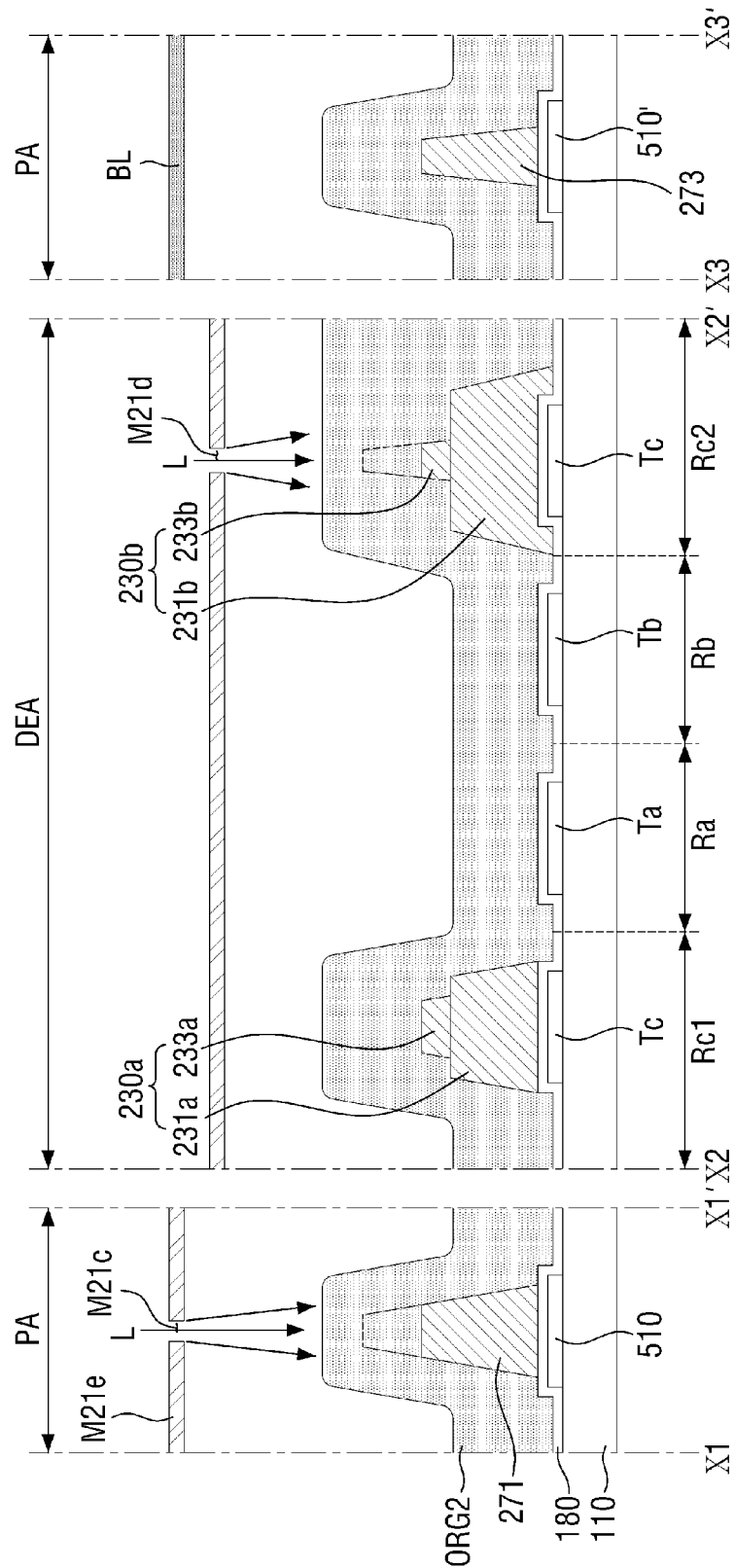
FIGS. 21 through 23 are views illustrating a process of manufacturing a display device using a mask having the first mask pattern portion of FIG. 20.
Figure 22:
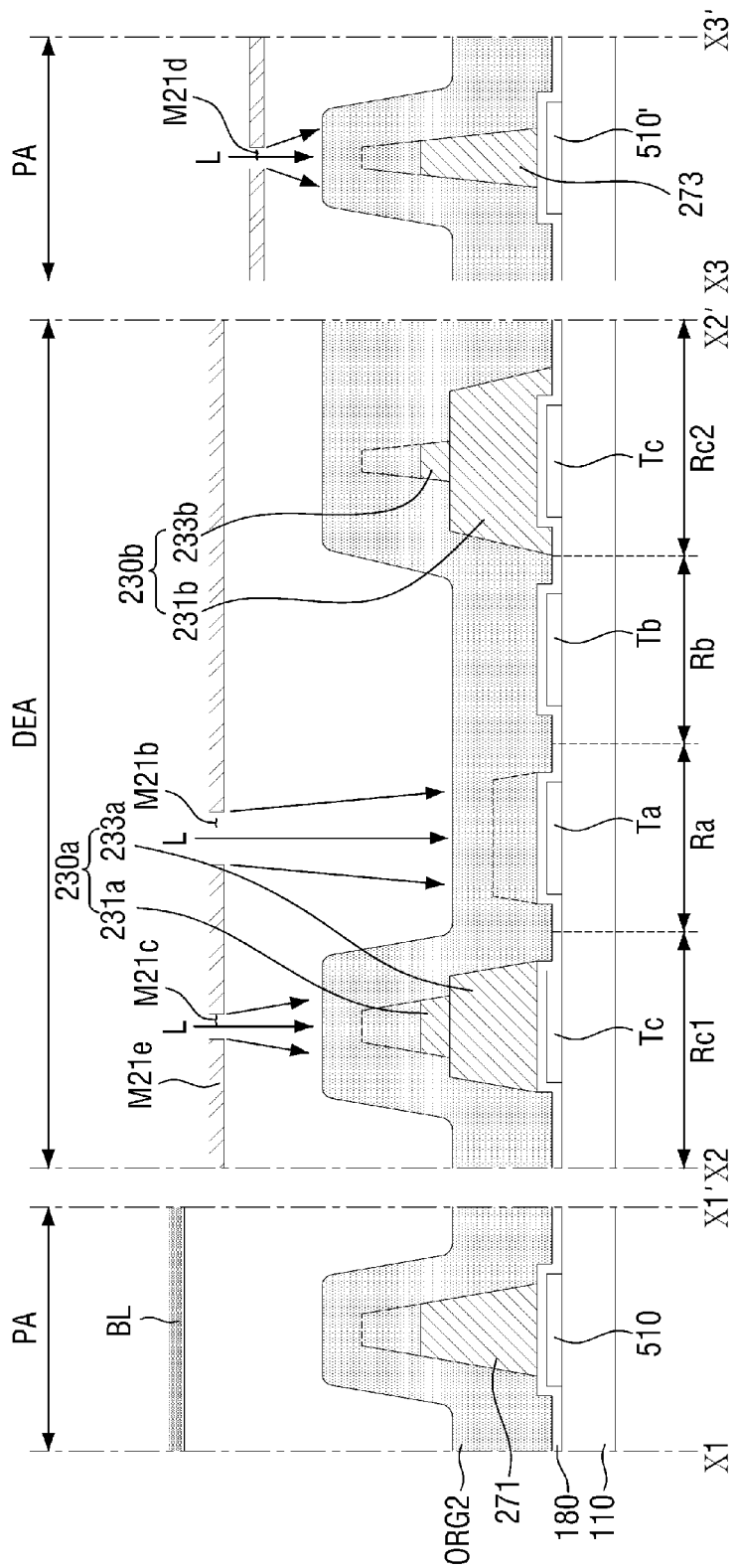
Figure 23:
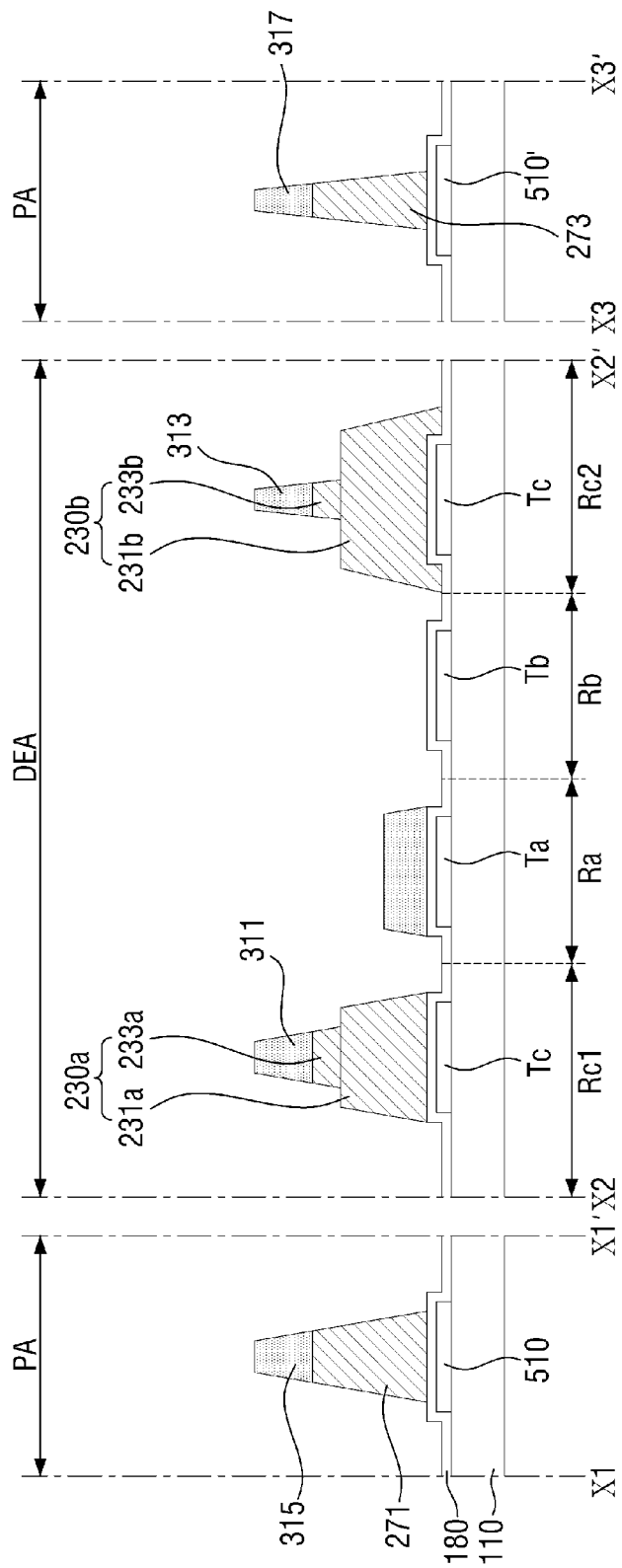

FIGS. 21 through 23 are views illustrating a process of manufacturing the display device 1 using a mask having the third mask pattern portion M21 of FIG. 20.

Referring to FIGS. 21 through 23, a second photosensitive material layer ORG 2 is formed on the entire surface of the first base substrate 110. The second photosensitive material layer ORG2 may include a photosensitive material and may include a colorant having a second color that is different from the first color. The photosensitive material may be a negative photosensitive material as in the case of the first photosensitive material layer ORG1.

Next, the third mask pattern portion M21 is placed above the first base substrate 110.

The first patterns M21a and the second patterns M21b of the third mask pattern portion M21 are placed to correspond to the first pixel regions Ra, the third patterns M21c are placed to correspond to the first circuit parts 510 or the first peripheral organic patterns 271, and the fourth patterns M21d are placed to correspond to the second specific pixel regions Rc2 or the second specific organic patterns 230b. In addition, a portion of the first base substrate 110 that does not overlap the third mask pattern portion M21 is covered by a light shielding member BL.

Next, the second photosensitive material layer ORG2 is cured by irradiating light L such as ultraviolet light toward the first base substrate 110 from above the third mask pattern portion M21. That is, a third exposure process is performed.

Next, referring to FIG. 22, the third mask pattern portion M21 is moved to align some of the first pixel regions Ra that are unexposed to light with the first patterns M21a and the second patterns M21b of the third mask pattern portion M21 during the third exposure process. In the aligning process, the third patterns M21c are aligned with the first specific pixel regions Rc1 or the first specific organic patterns 230a, and the fourth patterns M21d are aligned with the second circuit parts 510' or the second peripheral organic patterns 273.

Next, the second photosensitive material layer ORG2 is cured by irradiating light L such as ultraviolet light toward the first base substrate 110 from above the third mask pattern portion M21. That is, a fourth exposure process is performed.

Next, uncured or unexposed portions of the second photosensitive material layer ORG2 are removed to form the first insulating patterns Pta1 of the first pixels Pxa as well as third specific organic patterns 311, fourth specific organic patterns 313, third peripheral organic patterns 315, and fourth peripheral organic patterns 317 illustrated in FIG. 23.

Next, a mask for forming the second pixels Pxb is prepared.

Figure 24:
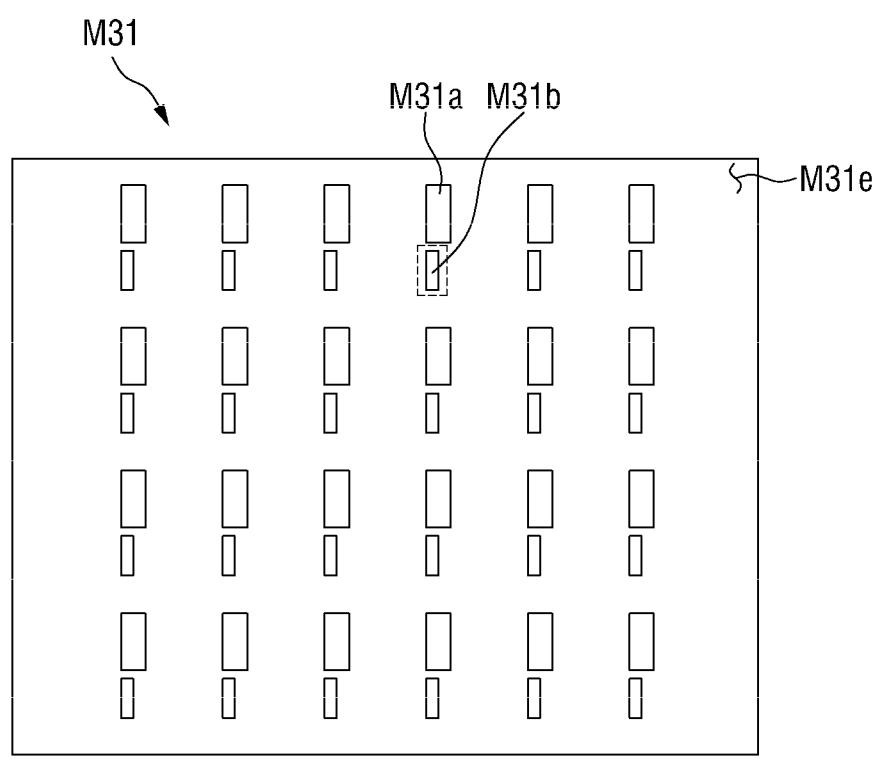
FIG. 24 is a plan view of a first mask pattern portion of a mask for forming organic patterns of second pixels illustrated in FIG. 1.

FIG. 24 is a plan view of a fourth mask pattern portion M31 of a mask for forming organic patterns of the second pixels Pxb illustrated in FIG. 1.

Referring to FIG. 24, the fourth mask pattern portion M31 for forming the second pixels Pxb may include first patterns M31a corresponding to first insulating patterns Ptb1 of the second pixels Pxb, second patterns M31b corresponding to second insulating patterns Ptb2 of the second pixels Pxb, and a light shielding portion M31e.

Figure 25:
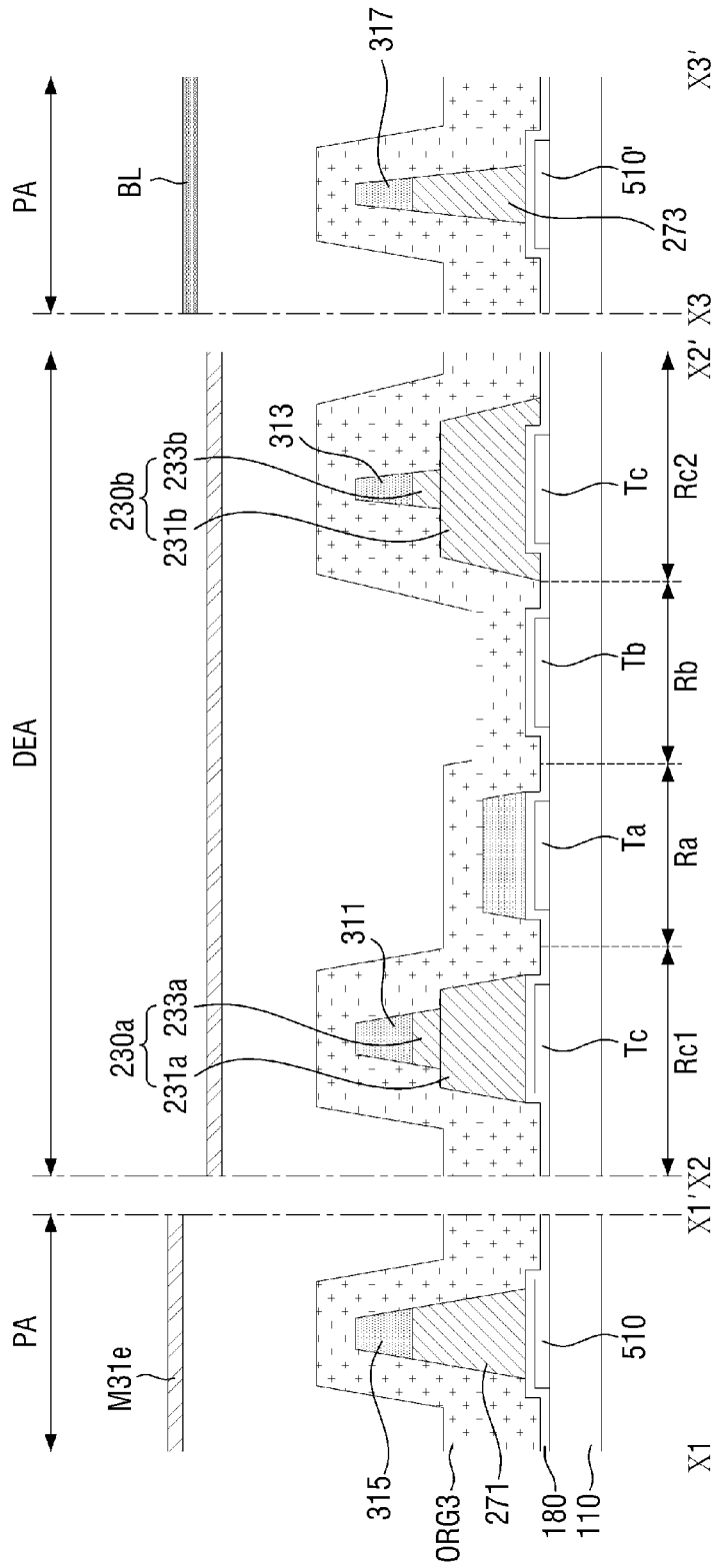
FIGS. 25 through 27 are views illustrating a process of manufacturing a display device using a mask having the first mask pattern portion of FIG. 24.
Figure 26:
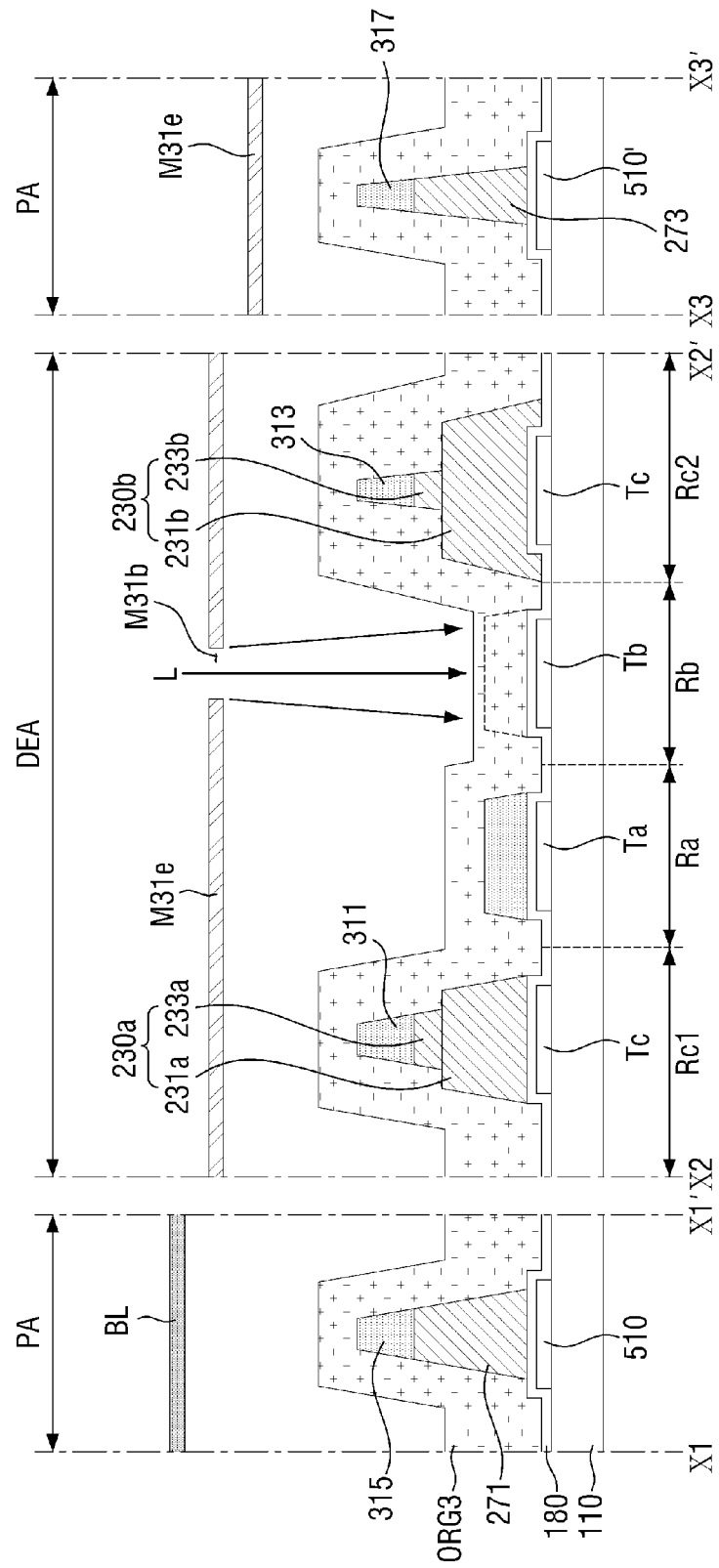
Figure 27:
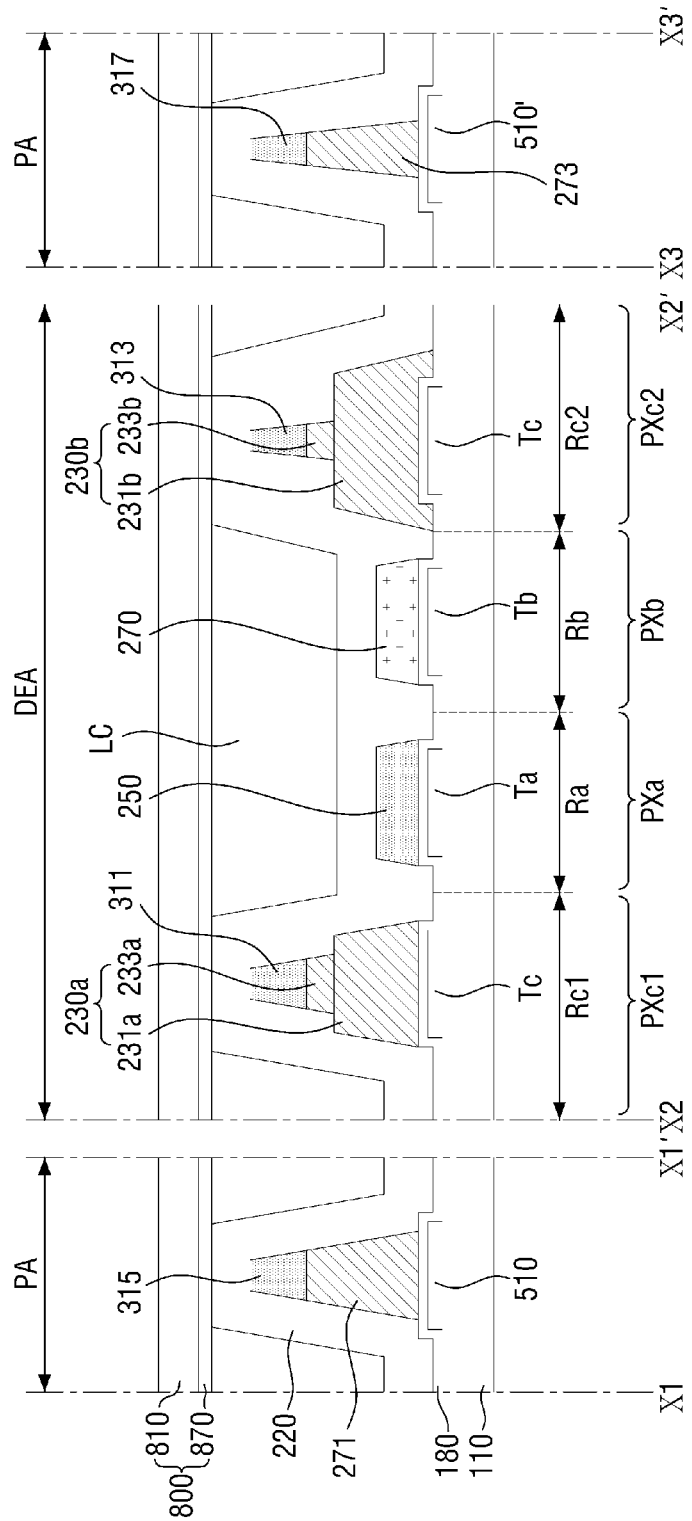

FIGS. 25 through 27 are views illustrating a process of manufacturing the display device 1 using a mask having the fourth mask pattern portion M31 of FIG. 24.

Referring to FIGS. 25 through 27, a third photosensitive material layer ORG3 is formed on the entire surface of the first base substrate 110. The third photosensitive material layer ORG3 may include a photosensitive material and may include a colorant having a third color that is different from the first color and the second color. The photosensitive material may be a negative photosensitive material as in the case of the first photosensitive material layer ORG1.

Next, the fourth mask pattern portion M31 is placed above the first base substrate 110.

The first patterns M31a and the second patterns M31b of the fourth mask pattern portion M31 are placed to correspond to the second pixel regions Rb. In addition, a portion of the first base substrate 110 that does not overlap the fourth mask pattern portion M31 is covered by a light shielding member BL.

Next, a fifth exposure process is performed by irradiating ultraviolet light from above the fourth mask pattern portion M31.

Next, referring to FIG. 26, the fourth mask pattern portion M31 is moved to align some of the second pixel regions Rb that are unexposed to light with the first patterns M31a and the second patterns M31b of the fourth mask pattern portion M31 during the fifth exposure process. Then, a sixth exposure process is performed.

Next, uncured or unexposed portions of the third photosensitive material layer ORG3 are removed to form the first insulating patterns Ptb1 of the second pixels Pxb and second organic patterns 270 illustrated in FIG. 27.

Next, a transparent conductive layer may be deposited and patterned to form the pixel electrode 150 of each pixel. In addition, the light shielding layer 220 may be formed to produce an array substrate 100.

Next, the counter substrate 800 may be placed to face the array substrate 100, and the liquid crystal layer LC may be placed between the array substrate 100 and the counter substrate 800 to produce the display device 1.

In the display device of the current embodiment, double exposure is performed at the boundary of a portion where a mask split exposure process is performed. Therefore, a uniform cell gap at the split exposure boundary can be obtained preventing deterioration of display quality of the display device. In addition, since patterns are also formed in the peripheral area PA, it is possible to prevent a short circuit between the common electrode 870 and the elements of the array substrate 100 and/or prevent an occurrence of other defects and further prevent deterioration of display quality because a uniform cell gap can be maintained in the peripheral area PA improving the reliability of the display device.

Embodiments of the present disclosure provide at least the following advantage.

That is, a display device with improved display quality and reliability can be provided.

However, the effects of the embodiments of the inventive concept are not restricted to the one set forth herein. The above and other effects of the embodiments will become more apparent to one of daily skill in the art to which the embodiments pertain by referencing the claims.

Although the exemplary embodiments of the present disclosure have been disclosed for illustrative purposes, the embodiments are only exemplified, but do not limit the present disclosure. Those skilled in the art will appreciate that various modifications and applications are possible, without departing from the scope and spirit of the present disclosure as disclosed in the accompanying claims. For example, each element specified in embodiments of the present disclosure can be variously modified and implemented. Further, differences related to such modifications and applications should be interpreted as being included in the scope of the present disclosure defined by the accompanying claims.

What is claimed is:

1. A display device comprising:
   a base substrate that comprises a display area and a peripheral area;
   a first circuit part that is located in the peripheral area of the base substrate;
   a first pixel that is located in the display area of the base substrate; and
   a second pixel that is located in the display area of the base substrate,
   wherein the first pixel is located between the first circuit part and the second pixel along a direction and comprises a first organic pattern that comprises a first portion located on the base substrate and a second portion protruding upward from the first portion, and the second pixel comprises a second organic pattern that comprises a third portion located on the base substrate and a fourth portion protruding upward from the third portion, wherein the first portion, the second portion, the third portion, and the fourth portion are made of the same material, and a width of the second portion measured along the direction is different from a width of the fourth portion measured along the direction, and
   wherein the first portion and the third portion comprise a first colorant of a same color.

2. The display device of claim 1, wherein the first portion comprises a first overlap portion that overlaps the second portion and a first non-overlap portion that does not overlap the second portion, and the first overlap portion of the first portion has a hardness that is greater hardness than a hardness of the first non-overlap portion of the first portion.

3. The display device of claim 2, wherein the third portion comprises a second overlap portion that overlaps the fourth portion and a second non-overlap portion that does not overlap the fourth portion, and the second overlap portion of the third portion has a hardness that is greater than a hardness of the second non-overlap portion of the third portion.

4. The display device of claim 3, wherein the hardness of the first overlap portion is greater than the hardness of the second non-overlap portion, and the hardness of the second overlap portion is greater than the hardness of the first non-overlap portion.

5. The display device of claim 1, wherein the width of the second portion measured along the direction is greater than the width of the fourth portion measured along the direction, and a width of the first portion measured along the direction is smaller than a width of the third portion measured along the direction.

6. The display device of claim 1, wherein the first pixel further comprises a first thin film transistor that is located between the base substrate and the first organic pattern and overlaps the second portion, and the second pixel further comprises a second thin film transistor that is located between the base substrate and the second organic pattern and overlaps the fourth portion.

7. The display device of claim 1, further comprising:
   a third organic pattern that is located on the second portion; and a fourth organic pattern that is located on the fourth portion and is made of the same material as the third organic pattern, wherein the third organic pattern and the fourth organic pattern comprise a second colorant that is different from the first colorant.

8. The display device of claim 7, further comprising a light shielding layer that is located on the base substrate and covers the first organic pattern, the second organic pattern, the third organic pattern, and the fourth organic pattern.

9. The display device of claim 8, further comprising:
a counter substrate that is located on the light shielding layer; and
a liquid crystal layer that is located between the light shielding layer and the counter substrate,
wherein a portion of the light shielding layer that overlaps the second portion and a portion of the light shielding layer that overlaps the fourth portion are in contact with the counter substrate.

10. The display device of claim 1, further comprising a first peripheral organic pattern that is located on the first circuit part and is made of the same material as the first organic pattern and the second organic pattern.

11. The display device of claim 10, wherein the hardness of a first overlap portion of the first portion that overlaps the second portion is greater than a hardness of the first peripheral organic pattern.

12. The display device of claim 10, wherein the hardness of the second portion is greater than a hardness of the first peripheral organic pattern.

13. The display device of claim 10, further comprising:
a second circuit part that is located in the peripheral area of the base substrate and is located on an opposite side of the display area from the first circuit part; and
a second peripheral organic pattern that is located on the second circuit part and is made of the same material as the first peripheral organic pattern.

14. The display device of claim 13, wherein a width of the first peripheral organic pattern measured along the direction is greater than a width of the second peripheral organic pattern measured along the direction.

15. The display device of claim 13, further comprising:
a third peripheral organic pattern that is located on the first peripheral organic pattern; and
a fourth peripheral organic pattern that is located on the second peripheral organic pattern and is made of the same material as the third peripheral organic pattern,
wherein the first peripheral organic pattern and the second peripheral organic pattern comprise the first colorant, and the third peripheral organic pattern and the fourth peripheral organic pattern comprise a second colorant that is different from the first colorant.

16. The display device of claim 10, wherein the first circuit part comprises a contact region that electrically connect wirings formed in the first circuit part, and the first peripheral organic pattern does not overlap the contact region.

17. A display device comprising:
a base substrate that comprises a display area and a peripheral area;
a circuit part that is located in the peripheral area of the base substrate;
a first pixel that is located in the display area of the base substrate; and
a second pixel that is located in the display area of the base substrate,
wherein the first pixel is located between the circuit part and the second pixel along a direction and comprises a first organic pattern that comprises a first portion located on the base substrate and having a first hardness and a second portion having a second hardness that is greater than the first hardness, and the second pixel comprises a second organic pattern that comprises a third portion located on the base substrate and having a third hardness and a fourth portion having a fourth hardness that is greater than the third hardness, wherein a width of the first organic pattern measured along the direction is different from a width of the second organic pattern measured along the direction,
wherein the first organic pattern and the second organic pattern comprise a first colorant of a same color, and
wherein a width of the second portion having the second hardness measured along the direction is different from a width of the fourth portion having the fourth hardness measured along the direction.

18. The display device of claim 17, wherein the second hardness is greater than the third hardness, and the fourth hardness is greater than the first hardness.

19. The display device of claim 17, wherein the display area comprises a double exposure area, and the first pixel and the second pixel are located in the double exposure area.

* * * * *